(12) United States Patent
Mick et al.

(10) Patent No.: US 7,715,377 B2
(45) Date of Patent: *May 11, 2010

(54) APPARATUS AND METHOD FOR MATRIX MEMORY SWITCHING ELEMENT

(75) Inventors: John Mick, Alpine, AZ (US); Craig Lindahl, McKinney, TX (US); Yongdong Zhao, Pleasanton, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 1295 days.

This patent is subject to a terminal disclaimer.

(21) Appl. No.: 11/185,072

(22) Filed: Jul. 19, 2005

(65) Prior Publication Data

US 2005/0254330 A1 Nov. 17, 2005

Related U.S. Application Data

(63) Continuation-in-part of application No. 10/037,433, filed on Jan. 3, 2002, now Pat. No. 7,020,133.

(51) Int. Cl.
*H04L 12/56* (2006.01)

(52) U.S. Cl. .................. 370/371; 370/370; 370/413; 370/414; 370/235

(58) Field of Classification Search ............ 370/371, 370/235; 365/189.05; 712/15
See application file for complete search history.

(56) References Cited

U.S. PATENT DOCUMENTS

| | | | | |
|---|---|---|---|---|
| 5,088,062 A * | 2/1992 | Shikata | ......... | 365/189.05 |
| 5,535,197 A * | 7/1996 | Cotton | ......... | 370/395.72 |
| 5,673,398 A * | 9/1997 | Takeda | ......... | 710/105 |
| 5,838,684 A | 11/1998 | Wicki et al. | | |
| 6,487,171 B1 * | 11/2002 | Honig et al. | ......... | 370/235 |
| 6,907,001 B1 * | 6/2005 | Nakayama et al. | ......... | 370/230 |
| 7,020,133 B2 * | 3/2006 | Zhao et al. | ......... | 370/371 |
| 7,145,904 B2 * | 12/2006 | Zhao et al. | ......... | 370/371 |
| 7,346,063 B1 * | 3/2008 | Herbst | ......... | 370/395.7 |
| 7,380,100 B2 * | 5/2008 | Shimura et al. | ......... | 712/15 |
| 2003/0123468 A1 * | 7/2003 | Nong | ......... | 370/412 |

* cited by examiner

*Primary Examiner*—Dang T Ton
*Assistant Examiner*—Pamit Kaur
(74) *Attorney, Agent, or Firm*—Kenneth Glass; Glass & Associates

(57) ABSTRACT

A matrixed memory array device is disclosed that includes input ports and output ports. Each input port is coupled to a first data bus and each output port is coupled to a second data bus that is different and separate from the first data bus. A memory brick is placed at each cross-point between first data buses and second data buses so as to switchably couple frames of data from input ports to output ports. Each memory brick contains a plurality of eight transistor (8-T) memory cells that can be used to store, erase, read, write, and switchably couple a data bit from the input port to a corresponding output port.

24 Claims, 20 Drawing Sheets

INGRESS USER SWITCHING TAG FOR
UNICAST IFRAMES

501A →

| C1 (1-bit) | C2 (1-bit) | M=0 (1-bit) | E=0 (1-bit) | F (1-bit) | L (1-bit) | EGRESS PORT QoS (2-bit) |
|---|---|---|---|---|---|---|
| EGRESS SWITCH PORT ID (8-bit) ||||||||
| FLOW ID (8-bit) |||||||
| FLOW ID (8-bit) |||||||
| FLOW ID (6-bit) |||||| RESERVED = 00 (2-bit) |
| TEC (CRC OR PARITY CHECK) (8-bit) |||||||

FIG. 5A

INGRESS USER SWITCHING TAG FOR
MULTI-CAST IFRAMES

501B →

| C1 (1-bit) | C2 (1-bit) | M=1 (1-bit) | E=0 (1-bit) | F (1-bit) | L (1-bit) | EGRESS PORT QOS (2-bit) |
|---|---|---|---|---|---|---|
| 16-bit DIRECT MULTI-CAST EGRESS SWITCH PORT IDs (8-bit) |||||||
| 16-bit DIRECT MULTI-CAST EGRESS SWITCH PORT IDs (8-bit) |||||||
| 14-bit MCID CONTINUED (8-bit) |||||||
| 14-bit MCID CONTINUED (6-bit) |||||| RESERVED = 00 (2-bit) |
| TEC (CRC OR PARITY CHECK) (8-bit) |||||||

FIG. 5B

EGRESS USER SWITCHING TAG FOR
UNICAST IFRAMES

601A

| C1 (1-bit) | C2 (1-bit) | M=0 (1-bit) | E=0 (1-bit) | F (1-bit) | L (1-bit) | PQS UPDATE QOS (2-bit) |
|---|---|---|---|---|---|---|
| \multicolumn{7}{c}{PQS UPDATE ID (8-bit)} |
| \multicolumn{7}{c}{22-bit FLOW ID (8-bit)} |
| \multicolumn{7}{c}{22-bit FLOW ID (8-bit)} |
| 22-bit FLOW ID (6-bit) | | | | | RESERVED = 00 (2-bit) | |
| \multicolumn{7}{c}{TEC (CRC OR PARITY CHECK) (8-bit)} |

FIG. 6A

EGRESS USER SWITCHING TAG FOR
MULTI-CAST IFRAMES

601B

| C1 (1-bit) | C2 (1-bit) | M=1 (1-bit) | E=0 (1-bit) | F (1-bit) | L (1-bit) | PQS UPDATE QOS (2-bit) |
|---|---|---|---|---|---|---|
| \multicolumn{7}{c}{PQS UPDATE ID (8-bit)} |
| \multicolumn{7}{c}{RESERVED = 0000 0000 (8-bits)} |
| \multicolumn{7}{c}{14-bit MCID CONTINUED (8-bit)} |
| 14-bit MCID CONTINUED (6-bit) | | | | | RESERVED = 00 (2-bit) | |
| \multicolumn{7}{c}{TEC (CRC OR PARITY CHECK) (8-bit)} |

FIG. 6B

AAQST$_J$ TABLE UPDATE

| C1=1 (1-bit) | C2=1 (1-bit) | M=0 (1-bit) | E=0 (1-bit) | F=0 (1-bit) | L=0 (1-bit) | TYPE=00 (2-bit) ||
|---|---|---|---|---|---|---|---|
| 4-bit AQS$_{J,1,1}$ UPDATE INCREMENT ||||| 4-bit AQS$_{J,1,2}$ UPDATE INCREMENT |||
| 4-bit AQS$_{J,1,3}$ UPDATE INCREMENT ||||| 4-bit AQS$_{J,1,4}$ UPDATE INCREMENT |||
| 4-bit AQS$_{J,2,1}$ UPDATE INCREMENT ||||| 4-bit AQS$_{J,2,2}$ UPDATE INCREMENT |||
| 4-bit AQS$_{J,2,3}$ UPDATE INCREMENT ||||| 4-bit AQS$_{J,2,4}$ UPDATE INCREMENT |||
| • • • ||||||||
| 4-bit AQS$_{J,15,1}$ UPDATE INCREMENT ||||| 4-bit AQS$_{J,15,2}$ UPDATE INCREMENT |||
| 4-bit AQS$_{J,15,3}$ UPDATE INCREMENT ||||| 4-bit AQS$_{J,15,4}$ UPDATE INCREMENT |||
| 4-bit AQS$_{J,16,1}$ UPDATE INCREMENT ||||| 4-bit AQS$_{J,16,2}$ UPDATE INCREMENT |||
| 4-bit AQS$_{J,16,3}$ UPDATE INCREMENT ||||| 4-bit AQS$_{J,16,4}$ UPDATE INCREMENT |||
| TEC (CRC OR PARITY CHECK) (8-bit) ||||||||

APPARATUS AND METHOD FOR MATRIX MEMORY SWITCHING ELEMENT

RELATED APPLICATION

The present application is a CIP of the U.S. patent application Ser. No. 10/037,433 entitled "Switch Queue Predictive Protocol (SQPP) Based Packet Switching Technique", filed on Jan. 3, 2002 now U.S. Pat. No. 7,020,133 and owned by the assignee of this application, which is incorporated herein by reference.

FIELD OF THE INVENTION

The present invention relates generally to the field of integrated circuits. More specifically, the present invention relates to memory structure.

BACKGROUND ART

Various different types of system architectures can be used to build a packet/cell switching fabric. One type of system architecture is the shared bus architecture shown in FIG. 1A. Shared bus architectures include circuit boards 11 having multiple I/O buffers 12 that are coupled to a shared bus 10. Another type of system architecture is the shared memory architecture shown in FIG. 1B. Shared memory architectures include switch ports 21, a central switch fabric 22 and a shared memory 23. Yet another type of system architecture is the output buffered architecture shown in FIG. 1C. Output buffered architectures include switch ports 31 that have an output buffer 32 and a central switch fabric 33.

Shared bus architectures cannot practically be scaled to handle high bandwidth applications since data is transmitted in a broadcast fashion, requiring that each circuit board 11 wait its turn before transmitting on the shared bus 10. Shared memory and output buffered architectures are not easily scaled for two reasons: (1) the memory access speed of shared memory 23 (or output buffers 32), must be as fast as the overall bandwidth of central switch fabric 22 (or central switch fabric 33), and (2) shared memory 23 and output buffers 32 must be very large for packet/cell switching applications.

One type of system architecture that is more scalable and flexible than the architectures shown in FIGS. 1A-1C is the cross-point fabric with buffered input/output architecture shown in FIG. 1D. The cross-point fabric with buffered input/output architecture includes a plurality of line cards 41, each having an input/output (I/O) buffer 42, and a switch card 45, which includes a cross-point switch fabric 43 and an arbiter 44. Without an efficient and fast arbiter, the cross-point architecture with input/output buffer can become blocking. With very high-speed packet/cell transmission rates, it can be challenging to design an efficient arbitration algorithm that achieves 100% throughput for real life data network traffic.

The above-described packet switching technologies are further complicated if variable length packets are allowed. Most high-speed packet/cell switching technologies, such as those used in connection with the architectures of FIGS. 1A-1D require that variable length packets must first be padded into a fixed length internal packet/cells before switching. This padding process can add as much as 30% of transmission overhead to the switched cell/packet. Moreover, the complex arbiter 44 of the traditional cross-point fabric with buffered input/output architecture must be made even more complex to support variable length packets.

It would therefore be desirable to have an improved packet switching technology that overcomes the above-described deficiencies of conventional packet switching technologies. It would further be desirable to have a system that is bandwidth scalable. It would also be desirable to have a system that reduces the transmission overhead of variable length packets.

SUMMARY OF THE INVENTION

The present invention provides a method and a matrixed memory array device that can efficiently switch data packets in asynchronous communication system. The matrixed memory array device has input ports and output ports. Each input port is coupled to a first data bus and each output port is coupled to a second data bus different and separate from the first data bus. Memory bricks are placed at the cross-point between the first data buses and the second data buses so as to switchably couple frames of data from input ports to output ports. Thus, this architecture forms a matrix of memory bricks. Each memory brick contains a plurality of eight transistor (8-T) memory cells that can be used to store, erase, read, write, and switchably couple a data bit from the input port to a corresponding output port.

A method of transferring data packets using the matrixed memory array device is also disclosed that includes the steps of receiving a frame of data from an input port, coupling that frame of data into a memory brick that is dedicated to that particular input port and that is dedicated to only one output port separate and different from that input port, storing that frame of data in 8-T memory cells of that memory brick, and switchably coupling that frame of data to the output port.

The method of apparatus of the present invention allows for efficiently switching data packets in an asynchronous communication system. Moreover, the method and apparatus of the present invention is bandwidth scalable and reduces the transmission overhead of variable length packets. These and other advantages of the present invention will no doubt become obvious to those of ordinary skill in the art after having read the following detailed description of the preferred embodiments, which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

FIGS. 5A and 5B are block diagrams illustrating ingress User Switching Tags for uni-cast and multi-cast iFrames, respectively.

FIGS. 6A and 6B are block diagrams illustrating egress User Switching Tags for uni-cast and direct multi-cast egress User iFrames, respectively.

FIG. 8A is a block diagram illustrating an egress Control iFrame, which is used to implement an $AAQST_j$ Update in accordance with one embodiment of the present invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 2:
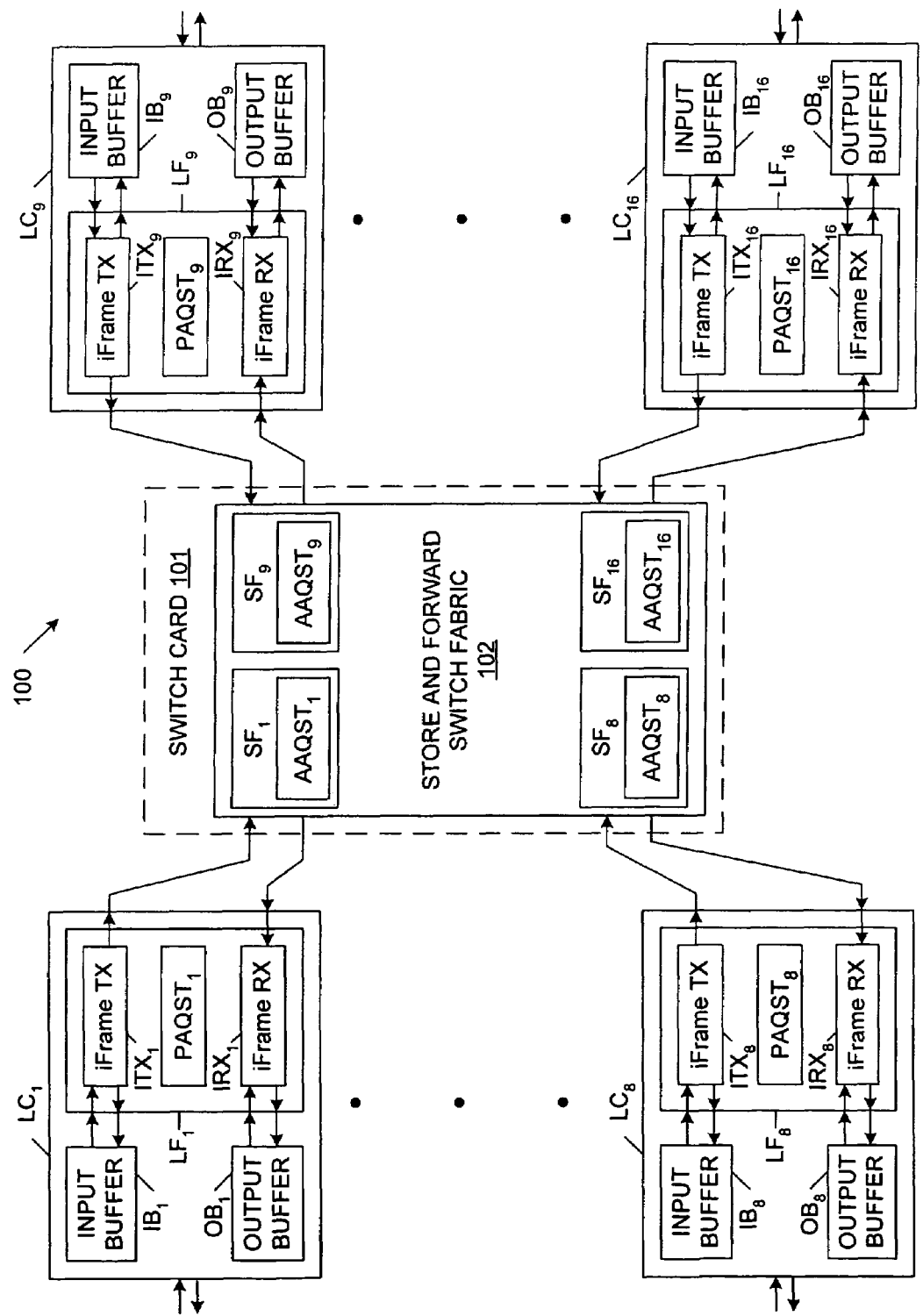
FIG. 2 is a block diagram illustrating a Switch Queue Predictive Protocol (SQPP) architecture in accordance with one embodiment of the present invention.

FIG. 2 is a block diagram illustrating a Switch Queue Predictive Protocol (SQPP) architecture 100 in accordance with one embodiment of the present invention. SQPP architecture 100 includes a switch card 101 having a store-and-forward switch fabric 102, and a plurality of line cards $LC_1$-$LC_{16}$. Line cards $LC_2$-$LC_7$ and $LC_{10}$-$LC_{15}$ are not illustrated for purposes of clarity. However, these line cards are connected in the same manner as illustrated line cards $LC_1$, $LC_8$, $LC_9$ and $LC_{16}$. Although sixteen line cards are described in the present embodiment, it is understood that other numbers of line cards can be used in other embodiments. Each line card $LC_N$ includes an input buffer $IB_N$, an output buffer $OB_N$, and a line card function block $LF_N$, where N includes the integers between 1 and 16, inclusive. Thus, line card $LC_1$ includes input buffer $IB_1$, output buffer $OB_1$ and line card function block $LF_1$. Each line card function $LF_N$ includes an internal frame transmitter $ITX_N$, an internal frame receiver $IRX_N$ and a Predicted Available Queue Space Table $PAQST_N$. Store-and-forward cross-point switch fabric 102 includes a cross-point switch and a plurality of switching function blocks $SF_1$-$SF_{16}$. Each switching function block $SF_N$ includes a corresponding Actual Available Queue Space Table $AAQST_N$. Each of the switching function blocks $SF_1$-$SF_{16}$ is coupled to a corresponding one of line card function blocks $LF_1$-$LF_{16}$. As described in more detail below, switch fabric 102 and input buffers $IB_1$-$IB_{16}$ are enhanced by the line card function blocks $LF_1$-$LF_{16}$ and the switching function blocks $SF_1$-$SF_{16}$, thereby enabling switch fabric 102 and input buffers $IB_1$-$IB_{16}$ to communicate with each other. As a result, the input buffers $IB_1$-$IB_{16}$ are enabled to automatically regulate the amount of traffic that is sent to switch fabric 102. In other words, the SQPP arbitration is performed in a distributed manner, so that multiple (distributed) less complex arbiters can be used. These distributed arbiters enable scaling to higher bandwidths.

Figure 1A:
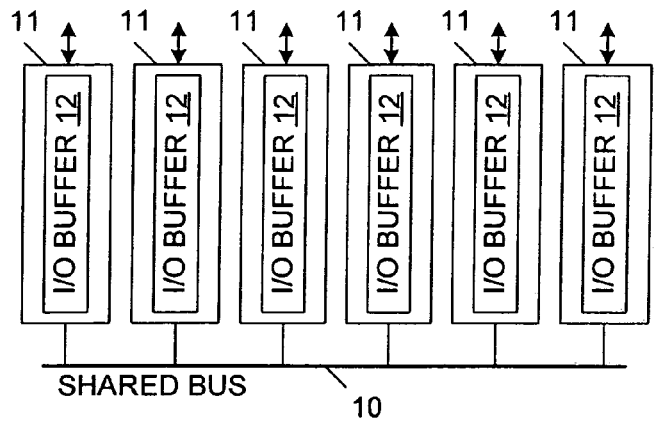
FIG. 1A is a block diagram illustrating a conventional shared bus architecture.
Figure 1B:
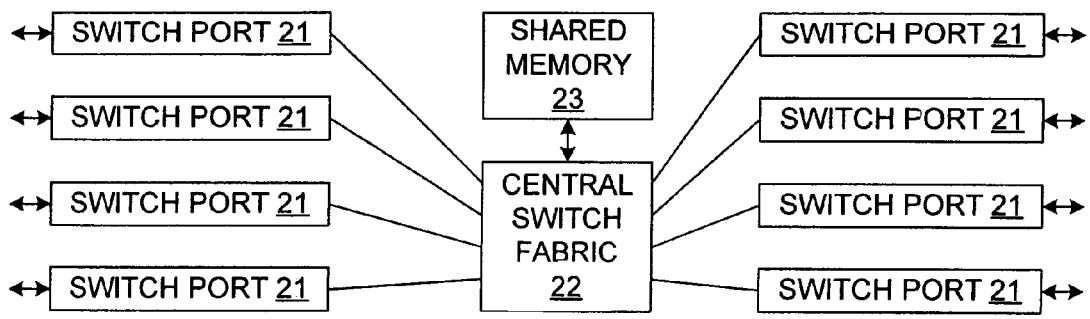
FIGS. 1B and 1C are block diagrams illustrating a conventional shared memory architecture and a conventional output buffered architecture, respectively.
Figure 1C:
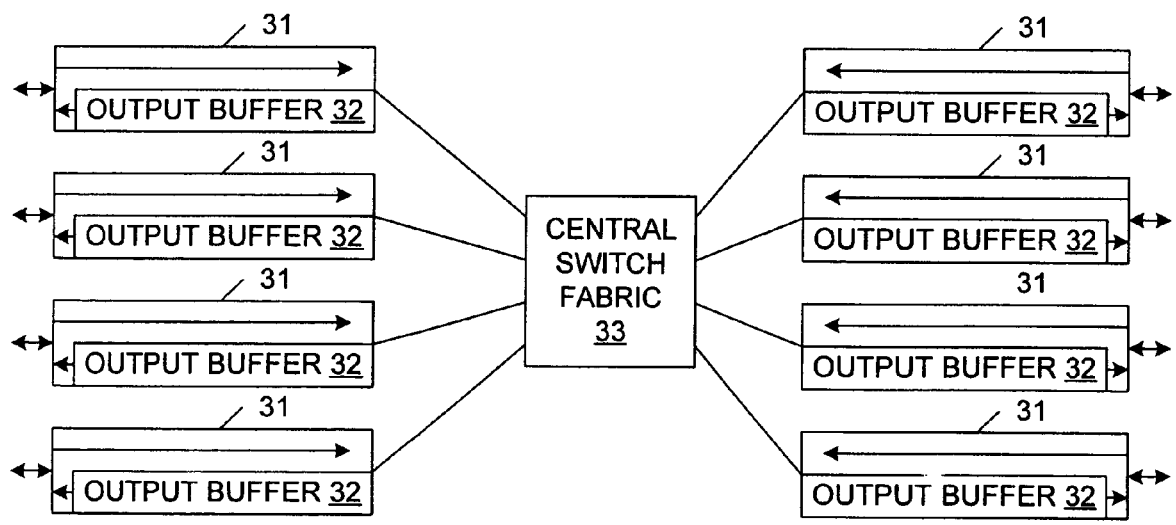
Figure 1D:
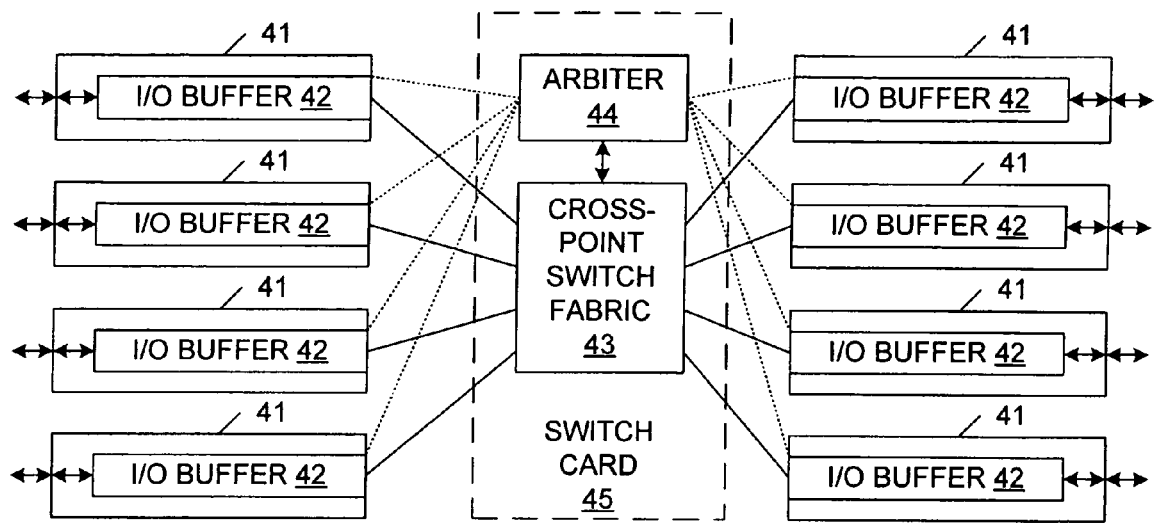
FIG. 1D is a block diagram illustrating a conventional cross-point fabric with buffered input/output architecture.

In contrast to the cut-through technique of the cross-point fabric with buffered input/output architecture (FIG. 1D), the SQPP architecture 100 uses a store-and-forward technique in which a complete datagram must be received before the internal frame is forwarded. The SQPP architecture 100 uses this store-and-forward technique to allow the ingress ports to operate asynchronously from the egress ports. Asynchronous operation makes it easy to switch variable length packets through the switch fabric. Variable length packet switching, as compared to fixed length packet switching (e.g. 53 byte), can reduce the switch port transmission rate significantly since the packet padding can add as much as 30% to the overhead.

When other forms of switching overhead are considered, some existing technologies must speed up the switch fabric by 30-60% to compensate for the internal switch overhead. As the required speed of the switch fabric is increased, power dissipation is increased, and the switch fabric becomes less efficient because more switching bandwidth must be used to switch the overhead data. It is therefore essential to reduce the internal switching overhead. As described in more detail below, the SQPP architecture 100 only requires an overhead of approximately 10-15%.

Figure 3:
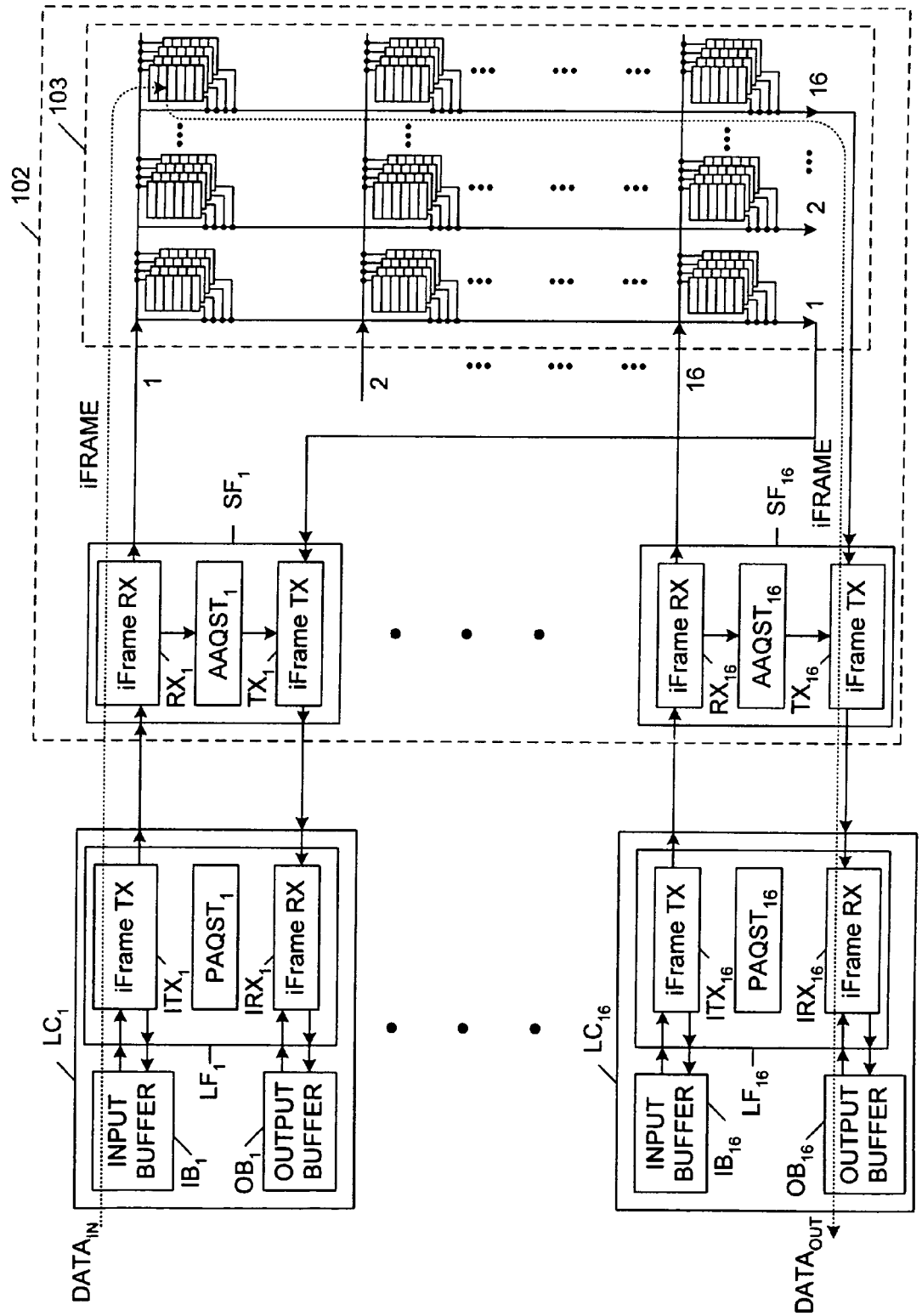
FIG. 3 is a block diagram illustrating portions of the SQPP architecture of FIG. 2 in more detail.

FIG. 3 is a block diagram illustrating portions of SQPP architecture 100 in more detail. In the example shown by FIG. 3, line card $LC_1$ receives user data ($DATA_{IN}$) from an external source. Line card function $LF_1$ translates the user data into datagrams, which are referred to as internal frames (or iFrames). In the described embodiment, iFrames can vary in size from 7 octets to 134 octets. The iFrame protocol is described in more detail below.

The iFrames are queued in the input buffer $IB_1$. The input buffer $IB_1$ can be large or small to support a large or small burst of data for a large or small number of connections. The size of the input buffer is determined by the traffic requirements of each application.

The iFrames are routed from the input buffer $IB_1$ under the control of line card function $LF_1$. More specifically, these iFrames are routed through iFrame transmitter $ITX_1$ to a corresponding iFrame receiver $RX_1$ in switch function block $SF_1$. Within switch card 101, iFrame receiver $RX_1$ transmits the iFrames to cross-point switch 103.

As described above, the line card function $LF_1$ buffers and exchanges iFrames to and from the switch fabric 102. It is also possible to move the line card function LF to the switch card 101. However, this is a less common method of implementation. If implemented in this way, then the line card function $LF_1$ could instead be viewed as a SQPP switch fabric port gating function. If the line card function $LF_1$ is located on the switch card 101, the input buffer $IB_1$ could be implemented on the line card $LC_1$ or on the switch card 101.

As seen in FIG. 3, switch fabric 102 includes cross-point switch 103. At each cross-point, there is a buffer (hereinafter referred to as a cross-point buffer). Each cross-point buffer includes four queues (hereinafter referred to as cross-point queues), one for each of four quality-of-service (QoS) classes implemented in the present embodiment. Although the present embodiment uses four QoS classes, it is understood that other numbers of QoS classes can be used in other embodiments. Each cross-point queue is configured to store up to 6 iFrames. In other embodiments, each cross-point queue can have another size. The size of the cross-point queue is not related to the traffic requirements of the application, but is instead designed to provide some microseconds of timing relief so that the SQPP protocol can be more easily realized and to achieve maximum throughput.

The switch fabric's cross-point memory size can be calculated by saying that $Q_{jkq}$ denotes the cross-point queue for the $j^{th}$ ingress switch port and $k^{th}$ egress switch port with $q^{th}$ QoS class. Each cross-point queue can store up to M iFrames with length L (in octets). Therefore we can say that $Q_{jkq}$=M*L (octets); j=1, ..., N; k=1, ..., N; q=1, ..., H. The total memory required, then, is $H*M*L*N_2$ (octets). Even though the cross-point queue size, M, could be any number, a small number, such as 6, may be sufficient. Although FIG. 3 illustrates the cross-point queues as being $N_2$ independent buffers, there are also other methods to organize the buffers. For example, one centralized buffer block could be used as long as it is partitioned into $N_2$ logically independent blocks.

In the described embodiment, switch card 101 maintains a table of the actual available queue space in the cross-point queues of switch fabric 102. This table is hereinafter referred to as an Actual Available Queue Space Table (AAQST). In the described embodiment, the AAQST is comprised of 16 smaller $AAQST_j$ tables, one for each of line cards $LC_1$-$LC_{16}$, (where j varies from 1 to 16). In this embodiment, switch function blocks $SF_1$-$SF_6$ maintain $AAQST_1$-$AAQST_{16}$, respectively. Each of $AAQST_1$-$AAQST_{16}$ identifies the actual available queue space in a corresponding row of cross-point switch 103.

The entries of the AAQST table are maintained by switch fabric 102, and can be identified as actual queue spaces $AQS_{jkq}$, where j identifies the ingress switch port (j=1 to 16), k identifies the egress switch port (k=1 to 16), and q identifies the QoS class (q=1 to 4). For the, $j^{th}$ line card, the AAQST table $AAQST_j$ is defined as follows.

TABLE 1

| ENTRIES IN $AAQST_j$ | | | |
|---|---|---|---|
| $AQS_{j,1,1}$ | $AQS_{j,1,2}$ | $AQS_{j,1,3}$ | $AQS_{j,1,4}$ |
| $AQS_{j,2,1}$ | $AQS_{j,2,2}$ | $AQS_{j,2,3}$ | $AQS_{j,2,4}$ |
| $AQS_{j,3,1}$ | $AQS_{j,3,2}$ | $AQS_{j,3,3}$ | $AQS_{j,3,4}$ |
| $AQS_{j,4,1}$ | $AQS_{j,4,2}$ | $AQS_{j,4,3}$ | $AQS_{j,4,4}$ |
| . | . | . | . |
| . | . | . | . |
| . | . | . | . |
| $AQS_{j,14,1}$ | $AQS_{j,14,2}$ | $AQS_{j,14,3}$ | $AQS_{j,14,4}$ |
| $AQS_{j,5,1}$ | $AQS_{j,15,2}$ | $AQS_{j,15,3}$ | $AQS_{j,15,4}$ |
| $AQS_{j,16,1}$ | $AQS_{j,16,2}$ | $AQS_{j,16,3}$ | $AQS_{j,16,4}$ |

Each of line cards $LC_1$-$LC_{16}$ maintains a table of the predicted available queue space of the associated cross-point queues in switch fabric 102. Each of these tables is hereinafter referred to as a Predicted Available Queue Space Table (PAQST). In this embodiment, line cards $LC_1$-$LC_{16}$ (and more specifically, line card functions $LF_1$-$LF_{16}$) maintain $PAQST_1$-$PAQST_{16}$, respectively. Each of $PAQST_1$-$PAQST_{16}$ identifies the predicted available queue space in a corresponding row of cross-point switch 102.

The entries of the PAQST table are maintained by line cards $LC_1$-$LC_{16}$, respectively, and can be identified as predictive queue spaces $PQS_{jkq}$, where j identifies the ingress switch port (j=1 to 16), k identifies the egress switch port (k=1 to 16), and q identifies the QoS class (q=1 to 4). For the, $j^{th}$ line card, the PAQST table $PAQST_j$ is defined as follows.

TABLE 2

| ENTRIES IN $PAQST_j$ | | | |
|---|---|---|---|
| $PQS_{j,1,1}$ | $PQS_{j,1,2}$ | $PQS_{j,1,3}$ | $PQS_{j,1,4}$ |
| $PQS_{j,2,1}$ | $PQS_{j,2,2}$ | $PQS_{j,2,3}$ | $PQS_{j,2,4}$ |
| $PQS_{j,3,1}$ | $PQS_{j,3,2}$ | $PQS_{j,3,3}$ | $PQS_{j,3,4}$ |
| $PQS_{j,4,1}$ | $PQS_{j,4,2}$ | $PQS_{j,4,3}$ | $PQS_{j,4,4}$ |
| . | . | . | . |
| . | . | . | . |
| . | . | . | . |
| $PSQ_{j,14,1}$ | $PSQ_{j,14,2}$ | $PSQ_{j,14,3}$ | $PSQ_{j,14,4}$ |
| $PQS_{j,5,1}$ | $PQS_{j,15,2}$ | $PQS_{j,15,3}$ | $PQS_{j,15,4}$ |
| $PQS_{j,16,1}$ | $PQS_{j,16,2}$ | $PQS_{j,16,3}$ | $PSQ_{j,16,4}$ |

When SQPP architecture 100 is initialized (i.e., before any iFrames are transmitted), each $PQS_{jkq}$ entry in the PAQST is set with a starting queue size that indicates how many iFrames the switch fabric cross-point queues can hold. In the present example, each $PQS_{jkq}$ entry is originally set to 6 (corresponding with 6 iFrames). At this time, the cross-point queues in switch fabric 102 are all empty (cleared), such that all entries in the cross-point fabric are available. Similarly, each $AQS_{jkq}$ entry in the AAQST is set a starting queue size representative of the capacity of each cross-point queue (e.g., 6).

Line card $LC_j$ is allowed to send user data to the $k^{th}$ egress switch port with the $q^{th}$ QoS class if and only if the predicted available queue space $PQS_{jkq}$ is not zero. When line card $LC_j$ sends an iFrame to the $k^{th}$ egress switch port of switch fabric 102, the line card $LC_j$ decrements the corresponding $PQS_{jkq}$ value by one. When switch fabric 102 receives the iFrame, this switch fabric 102 decrements the corresponding $AQS_{jkq}$ value by 1. When the switch fabric 102 forwards/transmits the iFrame to the $k^{th}$ egress switch port, the $AQS_{jkq}$ value is incremented by 1 and the switch fabric 102 sends a PQS Update message to the originating line card $LC_j$ to indicate that the iFrame has been forwarded. When the line card $LC_j$ receives the PQS Update, the line card $LC_j$ increments the $PQS_{jkq}$ value by 1.

The goal of the SQPP is to keep $PQS_{jkq}=AQS_{jkq}$ all the time. However, for various reasons such as iFrames being lost or corrupted and because of timing delays between the switch fabric 102 and line cards $LC_1$-$LC_{16}$, each $AQS_{jkq}$ and $PQS_{jkq}$ value can become different. Therefore specialized SQPP procedures are needed to periodically re-synchronize them.

Thus, the SQPP architecture 100 is designed to enable each of line cards $LC_1$-$LC_{16}$ to predict whether there is available space in the cross-point queues of switch fabric 102. An iFrame can be transmitted from line cards $LC_1$-$LC_6$ to switch fabric 102 only if available cross-point queue space is predicted within switch fabric 102. The accuracy of the prediction depends on the ability of switch fabric 102 to find sufficient transmission time to update line cards $LC_1$-$LC_{16}$ with the latest queue space information. The queue space information stored by line cards $LC_1$-$LC_{16}$ is commonly out of sync with the queue space information stored by switch fabric 102, due to the time delay for formulating, transmitting and interpreting the SQPP messages.

After passing through the switch fabric, the iFrames are queued in the output buffer of the destination line card. Each output buffer is sized similar to that of the input buffers (according to the assigned traffic). The input and output buffers provide storage for congestion conditions when the volume of incoming traffic exceeds the capacity of the system to forward that traffic (e.g., a momentary input burst at 50 Gb/s must be buffered to pass through a 40 Gb/s switch).

SQPP Protocol

The SQPP protocol will now be described in more detail. The SQPP protocol is comprised of three identities: (1) an iFrame definition, (2) an SQPP line card function that adds/removes the SQPP information to/from the user data stream, and (3) an SQPP switching function that passes SQPP iFrames between two line cards.

iFrame Definition

An internal frame, or "iFrame" is a variable length cell/packet used to exchange data between line cards $LC_1$-$LC_{16}$ and switch fabric 102. There are two iFrame formats that are used, namely, the User iFrame and the Control iFrame. The User iFrame is used to carry user data and generalized SQPP control information. The Control iFrame is used to carry specialized SQPP control information without user data. The User iFrames and Control iFrames are described in more detail below.

User iFrame Formats

A User iFrame is composed of a User Switching Tag and user payload data. There is a maximum length, L, defined for User iFrames, where L is a number of octets. In the described embodiments, L is equal to 134 octets.

Figure 4:
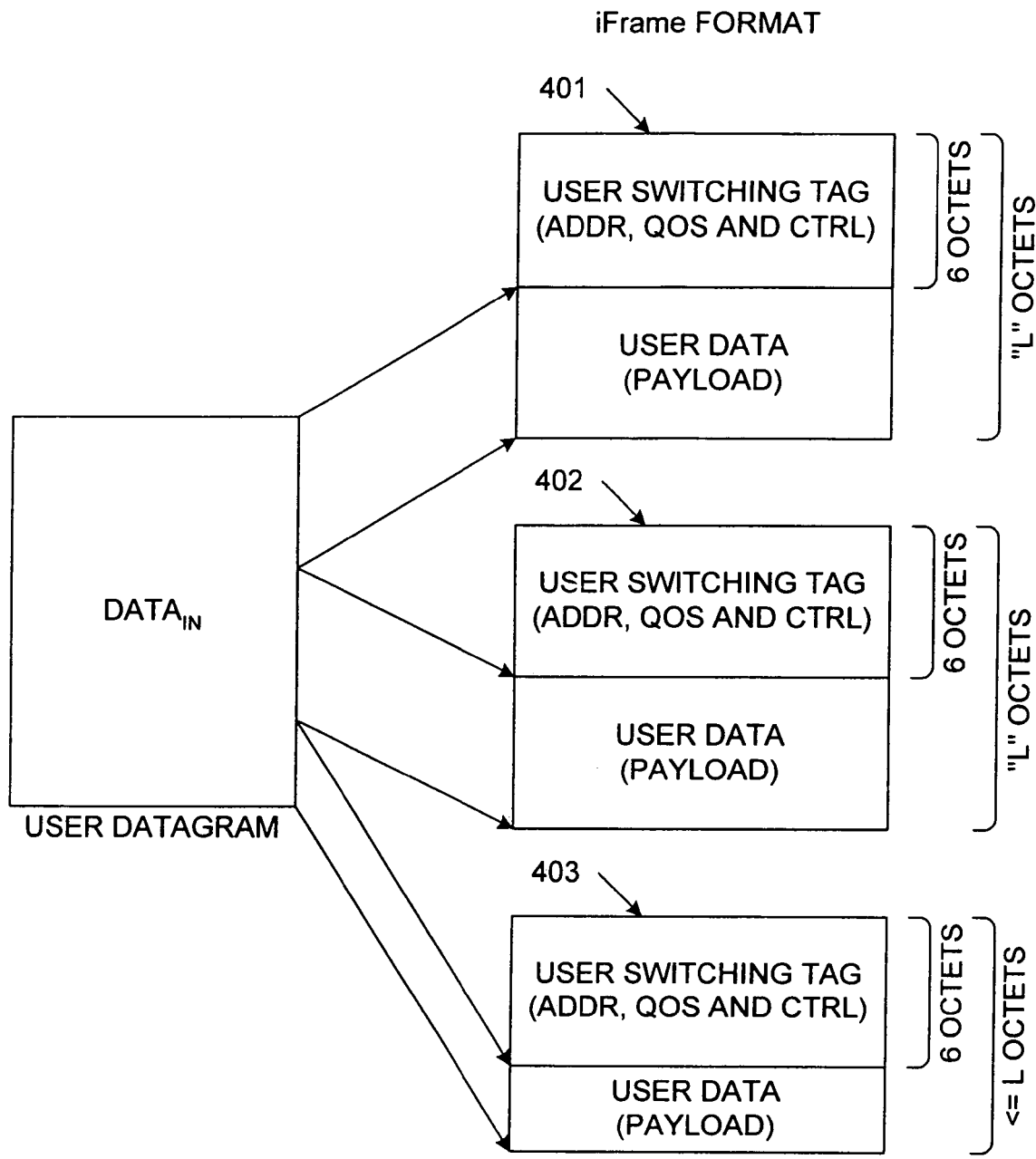
FIG. 4 is a block diagram illustrating the manner in which a received user datagram ($DATA_{IN}$) is formatted into User iFrames.

FIG. 4 is a block diagram illustrating the manner in which a received user datagram ($DATA_{IN}$) is formatted into User iFrames 401-403. Received user datagrams, such as $DATA_{IN}$, that are longer than (L-6) octets must be segmented into a sequence of iFrames. Each iFrame in the sequence is L in length except the last iFrame 403 of the sequence that has a length greater than six octets and less than or equal to L octets.

The received user datagram $DATA_{IN}$ is divided into three User iFrames 401-403. Each of the User iFrames includes a User Switching Tag having a length of 6 octets, followed by a portion of the user datagram $DATA_{IN}$, which is added to the User iFrame as user data (payload).

Note that the User Switching Tag will typically include a seventh octet, which is a packet delineation byte, which is not discussed in the disclosure. Assuming that 64-byte packets are encapsulated in 71 byte User iFrames (i.e., L=71), then the overhead is equal to (71−64)/71, or about 10%. Assuming that 40-byte packets are encapsulated in 47 byte User iFrames, then the overhead is equal to (47−40)/47, or about 15%.

Ingress User iFrame Formats

FIGS. 5A and 5B are block diagrams illustrating ingress User Switching Tags 501A and 501B for uni-cast and multi-cast iFrames, respectively. User Switching Tags for the ingress direction differ from User Switching Tags for the egress direction. The first six bits of each ingress User Switching Tag 501A-501B are defined as follows. The first two bits C1/C2 are used to identify the iFrame command type. In the ingress direction (from line card $LC_j$ to switch fabric 102) the line card $LC_j$ sets the C1 and C2 bits to identify the iFrame command type as defined in Table 3.

TABLE 3

Ingress iFrame Command Types

| C1 | C2 | Action |
|---|---|---|
| 0 | 0 | User iFrame with no command action |
| 1 | 0 | User iFrame with request for $AAQST_j$ |
| 0 | 1 | Reserved |
| 1 | 1 | Control iFrame |

Thus, an ingress User iFrame will include a request for updating the $AAQST_j$ table, if the C1/C2 value is equal to "10". Note that the 'j' in the $AAQST_j$ request is implicitly understood because there is one AAQST table corresponding with each switch fabric port. The switch fabric 102 only sends an $AAQST_j$ table to e corresponding port j. For example, the switch fabric 102 will only send the $AAQST_3$ table to port 3 (connected to line card $LC_3$). An AAQST request from line card $LC_{15}$ (on port 15) will result in the switch fabric sending $AAQST_{15}$ to port 15. This mapping function is hardwired.

The third bit (M) of each ingress User Switching Tag 501A-501B is used to indicate whether the User iFrame is a uni-cast iFrame (M=0) or a multi-cast iFrame (M=1). Thus, M=0 in ingress User Switching Tag 501A, and M=1 in ingress User Switching Tag 501B. A uni-cast iFrame is sent to a single egress switch port, and a multi-cast iFrame is transmitted to a plurality of egress switch ports.

The fourth bit (E) of each ingress User Switching Tag 501A-501B is used to indicate whether the corresponding User iFrame uses an extended version of the iFrame protocol (E=1) or the standard version of the iFrame protocol (E=0). In the described embodiment, E=0, such that the standard iFrame protocol is implemented. However, this bit allows the SQPP to be extended to support more information in the future.

The fifth and sixth bits (F and L) of each ingress User Switching Tag are used to indicate the sequence type of the User iFrame (e.g., first, last, middle, only). The F and L sequence type bits are encoded according to Table 4.

TABLE 4

F/L Sequence Type Encoding

| F | L | Meaning |
|---|---|---|
| 0 | 0 | "Mid" User iFrame of a longer packet (neither first nor last) |
| 1 | 0 | First User iFrame of a longer user datagram |
| 0 | 1 | Last User iFrame of a longer user datagram |
| 1 | 1 | Only User iFrame associated with a user datagram (first and last) |

Thus, the User Switching Tags of iFrames 401, 402 and 403 (FIG. 4) will have F/L values of "10", "00" and "01" respectively.

Each of ingress User Switching Tags 501A-501B also includes 32-bits of addressing information associated with the corresponding user data payload. This addressing information is used by switch fabric 102 and the destination line card $LC_k$. For uni-cast User iFrames (M=0), the first 10-bits of this addressing information are used by the switch fabric 102 to steer the iFrame to the proper switch fabric egress port. These 10-bits are composed of a 2-bit egress port QoS class ID and an 8-bit switch fabric egress port ID. Because there are only 16 switch fabric egress ports in the described example, only 4 of these 8-bits are required in the present example. The next 22-bits (8-bits+8-bits+6-bits) are used to identify the Flow ID (FLID) of the ingress User iFrame. Switch fabric 102 does not directly use the FLID, except that the switch fabric stores the FLID for re-transmission in the egress direction.

At the end of the FLID field, there are 2-bits that are unused/reserved for future use, followed by eight bits that are used for transmission error checking (TEC). The 8-bit TEC may be composed of an 8-bit CRC or parity code (hereinafter referred to as the CRC). If additional protection is preferred, the 2 unused bits can be used to expand the error protection to a 10-bit CRC. The CRC field of a User iFrame only protects the ingress User switching Tag (not the appended user data).

Multi-cast User iFrames can be supported using one of two methods. The first multi-cast method uses a direct multi-cast addressing technique and is applicable for systems with 16 or fewer ports. The direct multi-cast addressing technique uses the first 18 bits of the address information. The first 2-bits indicate the egress port quality of service. The remaining 16 bits of direct multi-cast addressing are used as a bit map to indicate which egress ports are to receive the User iFrame. The first bit of the 16-bits is used as an indication for the first port, and so on up to the sixteenth bit, which is used as an indication for the sixteenth port. A bit is set to a "1" value if the corresponding port is to receive the User iFrame. Conversely, a bit is reset to a "0" value if the corresponding port is not to receive the User iFrame.

The second multi-cast method enables the switch fabric to support more than 16 ports using an indirect multi-cast addressing technique. The indirect addressing technique requires the use of a look-up table, which can be implemented with an SRAM block of memory (indicated at the top of FIG. 10). Systems that only require 16 or fewer ports do not require the SRAM block and can be more efficiently implemented using the direct multi-cast addressing technique described above. The indirect multi-cast addressing technique uses the first 2 bits and the last 14 bits of the address information. The first 2 bits indicate the egress port quality of service. The last 14 bits indicate the multicast ID (MCID), and are used as an address that is applied to the SRAM. The data that is retrieved from the SRAM at the specified 14-bit address provides a bit mapped word to indicate which egress ports are to receive the User iFrame. Each bit position within the retrieved word indicates whether the User iFrame is to be sent to the port corresponding to the bit position. For example, a "1" value in the $32^{nd}$ bit position may be used to indicate whether the User iFrame is to be sent to the $32^{nd}$ port. The width of the SRAM word is set appropriately to support the number of ports supported by the system.

At the end of the MCID field, there are 2-bits that are unused/reserved for future use, followed by eight bits that are used for error checking (an 8-bit CRC or parity code). Again, the CRC only protects the ingress User Switching Tag (not the appended user data).

Egress User iFrame Formats

In the egress direction, the switch fabric 102 modifies portions of the ingress User Switching Tag before re-transmitting the iFrame out an egress switching port. FIGS. 6A and 6B illustrate egress User Switching Tags 601A and 601B for uni-cast egress User iFrames and direct multi-cast egress User iFrames, respectively.

The first six bits of each Egress User Switching Tag are defined as follows. The first two bits C1/C2 are used to identify the iFrame command type. The next four bits M/E/F/L have the same functions described above in the ingress User iFrame section.

In the egress direction (from switch fabric 102 to destination line card LC.sub.k), the switch fabric 102 sets the C1 and C2 bits to identify a command type as coded in Table 5.

TABLE 5

Egress iFrame Command Types

| C1 | C2 | Action |
|---|---|---|
| 0 | 0 | User iFrame with no command action |
| 1 | 0 | User iFrame with PQS Update |
| 0 | 1 | Reserved |
| 1 | 1 | Control iFrame |

Thus, an egress User iFrame will include a Predictive Queue Space (PQS) Update, if the C1/C2 value is equal to "10". In this case, the last two bits of the first octet represent a 2-bit PQS Update QoS value, which identifies the QoS class associated with the PQS Update. The next 8-bits provide an 8-bit PQS Update ID to identify the cross-point buffer for which the Update is being sent. The PQS Update implicitly causes the associated PQS entry to be incremented by a count of one.

If the C1/C2 value is equal to "00", then the 2-bit PQS Update QoS and 8-bit PQS Update ID are not used, and are set to 0 values.

For uni-cast egress User iFrames (M=0), the 22-bit FLID field is unchanged from the ingress uni-cast User iFrame. The next 2-bits are unused/reserved, and are set to zero values. A new error correction code (CRC) is generated and appended to the end of the egress User Switching Tag.

For multi-cast egress User iFrames (M=1), the first 8-bits of the FLID field (i.e., the eight remaining bits from the direct multi-cast egress switch port IDs) become unused/reserved and are set to 0. The 14-bit multi-cast ID (MCID) field is unchanged from the multi-cast ingress User iFrame. The next 2-bits are unused/reserved, and are set to zero values. A new error correction code (CRC) is generated and appended to the end of the egress User Switching Tag.

Ingress Control iFrames

Control iFrames are only used to carry SQPP control information. Thus, there is no user data (payload) associated with a Control iFrame.

An ingress Control iFrame can be used to implement the following functions: (1) an AAQST Update Request, or (2) a Cross-point Queue Purge.

Figure 7A:
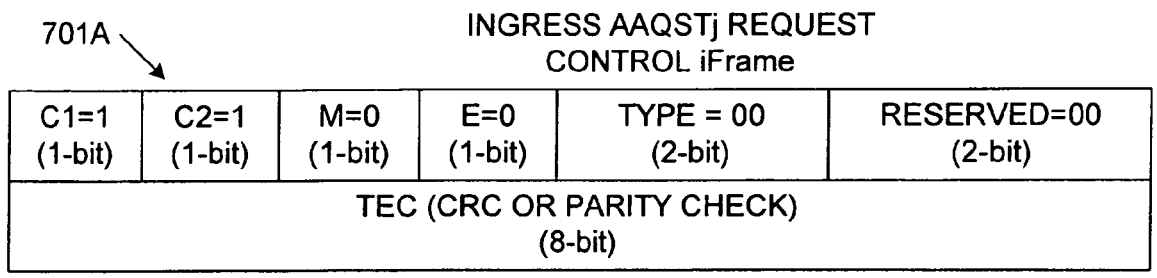
FIG. 7A is a block diagram illustrating an ingress Control iFrame, which is used to implement an Actual Available Queue Space Table ($AAQST_j$) Update Request in accordance with one embodiment of the present invention.

FIG. 7A is a block diagram illustrating an ingress Control iFrame 701A, which is used to implement an $AAQST_j$ Update Request in accordance with one embodiment of the present invention. In general, ingress $AAQST_j$ Request Control iFrame 701A is transmitted from one of the line cards $LC_j$ to switch fabric 102. In response, switch fabric 102 retrieves the actual available queue space table ($AAQST_j$) associated with this line card $LC_j$. Switch fabric 102 then transmits this table ($AAQST_j$) back to the line card $LC_j$ (using an egress $AAQST_j$ Update Control iFrame described below), such that the line card $LC_j$ can update its predicted available queue space table ($PAQST_j$).

As described above in Tables 3 and 5, Control iFrames are identified when the C1/C2 bits of the iFrame have a "11" value. Thus, ingress Control iFrame 701A includes C1/C2 bits having a "11" value. The M and E bits of ingress Control iFrame 701A are both set to "0" values.

The fifth and sixth bits of the first octet of an ingress Control iFrame defines the ingress Control iFrame Type. Table 6 defines the "Type" coding for ingress Control iFrames.

TABLE 6

Ingress Control iFrame Type Coding

| Type | Action |
|---|---|
| 00 | $AAQST_j$ Request Control iFrame |
| 01 | Purge Control iFrame |
| 10 | Reserved |
| 11 | Reserved |

Thus, the $5^{th}$ and $6^{th}$ bits of ingress $AAQST_j$ Request Control iFrame 701A have a value of "00".

The last two bits of the first octet in ingress $AAQST_j$ Request Control iFrame 701A are reserved for future use, and have a value of "00".

An error correction code (CRC) is added to the end of each ingress Control iFrame (including ingress Control iFrame 701A) to protect the entire ingress Control iFrame.

Figure 7B:
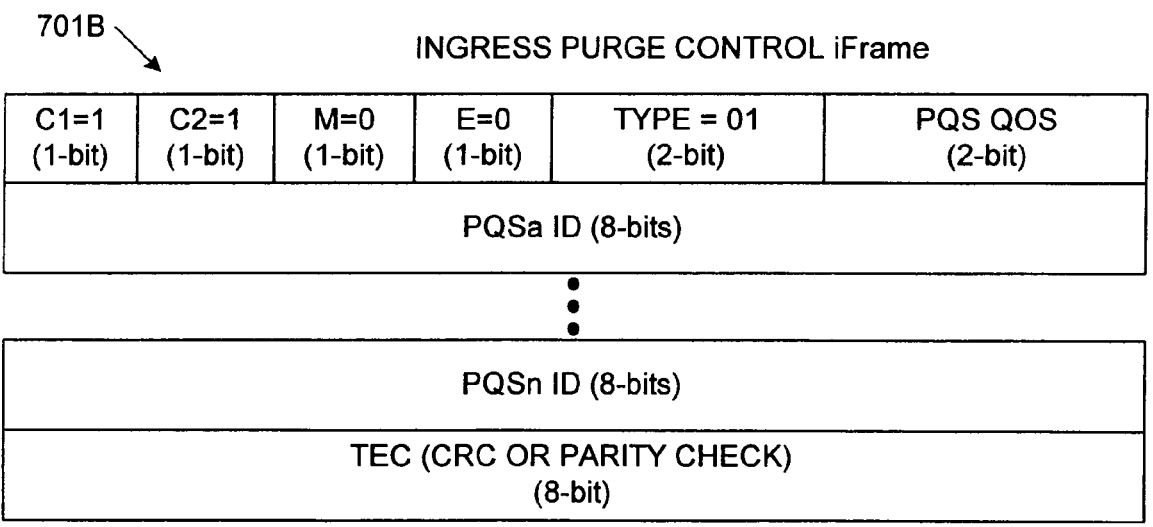
FIG. 7B is a block diagram illustrating an ingress Control iFrame, which is used to implement a Cross-point Queue Purge Request in accordance with one embodiment of the present invention.

FIG. 7B is a block diagram illustrating an ingress Control iFrame 701B, which is used to implement a Cross-point Queue Purge Request in accordance with one embodiment of the present invention. In general, ingress Purge Control iFrame 701B is transmitted from one of the line cards $LC_j$ to switch fabric 102. The ingress Purge Control iFrame 701B provides the addresses of selected cross-point queues within switch fabric 102. In response, switch fabric 102 resets the contents of the addressed cross-point queues and forces the AQS counts for the addressed cross-point queues to their maximum value (e.g., 6), as though the cross-point queues are empty. At the same time, the line card $LC_j$ forces its associated PQS counts in its predicted available queue space table ($PAQST_j$) to their maximum value (e.g., 6), thereby providing consistency between switch fabric 102 and line card $LC_j$.

The C1/C2 bits of ingress Control iFrame 701B have a "11" value (consistent with Table 3 above), thereby identifying iFrame 701B as a Control iFrame. The M and E bits of ingress Control iFrame 701B are both set to "0" values.

The fifth and sixth bits of ingress Purge Control iFrame 701B have a value of "01", consistent with "Type" coding set forth in Table 6 above.

The last two bits of the first octet in ingress Purge Control iFrame 701B identify the QoS class associated with the Cross-point Queue Purge.

An error correction code (CRC) is added to the end of ingress Purge Control iFrame 701B to protect the entire ingress Control iFrame.

Egress Control iFrames

An egress Control iFrame can be used to implement the following functions: (1) an actual available queue space table (AAQST) Update, or (2) a predicted available queue space table (PAQST) Control Update [PQS Control Update].

FIG. 8A is a block diagram illustrating an egress Control iFrame 801A, which is used to implement an $AAQST_j$ Update in accordance with one embodiment of the present invention. In general, egress $AAQST_j$ Update Control iFrame 801A is transmitted from switch fabric 102 to one of the line cards $LC_j$ (in response to an ingress $AAQST_j$ Request Control iFrame 701A). The egress Control iFrame 801A includes a payload that includes the actual queue space values ($AQS_{jkq}$) of the $AAQST_j$ table.

As described above in Tables 3 and 5, Control iFrames are identified when the C1/C2 bits of the iFrame have a "11" value. Thus, egress Control iFrame 801A includes C1/C2 bits having a "11" value. The M and E bits of egress Control iFrame 801A are both set to "0" values.

The fifth and sixth bits of the first octet of an egress Control iFrame are set to a value of "00". The last two bits of the first octet define the egress Control iFrame Type. Table 7 defines the "Type" coding for egress Control iFrames.

TABLE 7

Egress Control iFrame Type Coding

| Type | Action |
|---|---|
| 00 | $AAQST_j$ Update Control iFrame |
| 01 | Future specialized Control iFrame |
| 10 | PQS Control iFrame |
| 11 | Reserved |

Thus, the last two bits of the first octet of egress $AAQST_j$ Update Control iFrame 801A have a value of "00".

In the described embodiment, the following octets include 4-bit update increments for each of the actual queue space values $AQS_{jkq}$, where j indicates the ingress port, k indicates the egress port and q indicates the QoS. These AQS values are used to update the predicted available queue space table (PAQST) in the line card $LC_j$.

An error correction code (CRC) is added to the end of each egress Control iFrame (including egress AAQST Update Control iFrame 801A) to protect the entire egress Control iFrame.

Figure 8B:
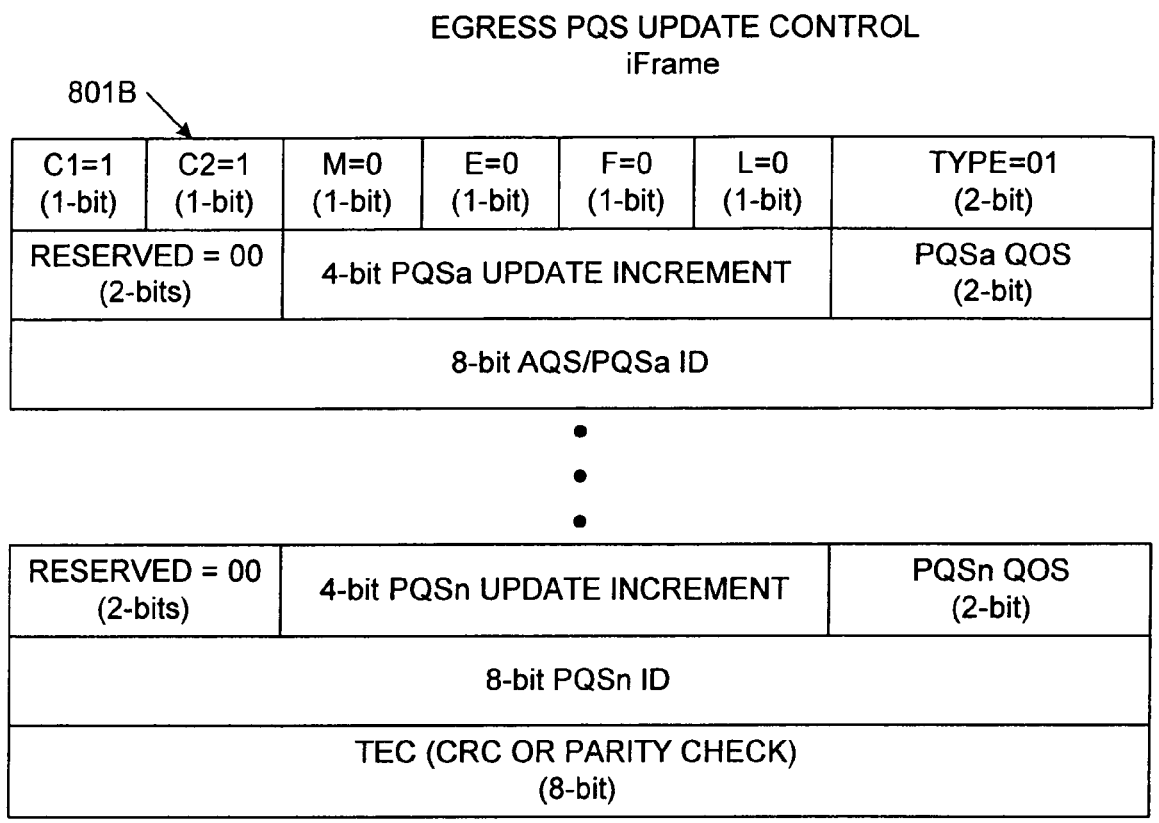
FIG. 8B is a block diagram illustrating an egress Control iFrame, which is used to implement a predicted queue space (PQS) update in accordance with one embodiment of the present invention.

FIG. 8B is a block diagram illustrating an egress Control iFrame 801B, which is used to implement a predicted queue space (PQS) control update in accordance with one embodiment of the present invention. In general, egress PQS Update Control iFrame 801B is transmitted from switch fabric 102 to one of line cards $LC_j$ (after switch fabric 102 transmits one or more associated data values from a cross-point queue to a $k^{th}$ egress port). The egress PQS Update Control iFrame 801B provides one or more predictive queue space update increments, as well as their corresponding locations within the predicted available queue space table $PAQST_j$. In response, line card $LC_j$ updates the $PAQST_j$ table, thereby keeping the line card $PAQST_j$ table in near synchronism with that of the switch fabric AAQST. Note that in the time that it takes for the switch fabric to send the PQS Control Update, the line card may have sent one or more iFrames, leaving the possibility that by the time the PQS Control Update is interpreted by the line card, the AAQST may have already changed. Thus, the present technique can be described as "predictive" with occasional synchronization.

The C1/C2 bits of egress Control iFrame 801B have a "11" value (consistent with Table 5 above), thereby identifying iFrame 801B as a Control iFrame. The M and E bits of ingress Control iFrame 701B are both set to "0" values. The fifth and sixth bits of egress PQS Update Control iFrame 801B have a value of "00".

The last two bits of the first octet in Control iFrame 801B have a Type value of "01", thereby identifying the type of the egress Control iFrame as a PQS Update Control iFrame, as defined by Table 7.

In the described embodiment, the next information contained in the Control iFrame includes one or more PQS Updates that are encoded in octet pairs that include: 2-reserved bits, a 4-bit PQS update increment value for an entry of the $PAQST_j$ table, and a corresponding 10-bit address of the $PAQST_j$ table, including a 2-bit QoS class identifier, and an 8-bit AQS/PQS address. The PQS update increment value, that can vary from 1 to 6, is used to update the addressed location of the predicted available queue space table (PAQST) in the line card $LC_j$.

An error correction code (CRC) is added to the end of the egress PQS Update Control iFrame to protect the entire egress Control iFrame.

Line Card Procedure for SQPP

The procedure for operating the line cards $LC_1$-$LC_{16}$ in accordance with the SQPP protocol will now be described in more detail.

After initialization, all of the cross-point queues in switch fabric 102 are available (i.e., empty). Thus, for the $j^{th}$ line card (j=1 to 16), each of the predicted available queue space values ($PQS_{jkq}$) is set to the maximum value of 6.

The $j^{th}$ line card ($LC_j$) is allowed to send an iFrame to the $k^{th}$ egress port with QoS class q, if and only if $PQS_{jkq}$ is greater than zero. This rule prevents iFrame loss in switch fabric 102. For the $j^{th}$ line card ($LC_j$), if $PQS_{jkq}$ is equal to B, then this line card $LC_j$ can send B consecutive iFrames to the $k^{th}$ egress port with QoS class q in switch fabric 102. The $PQS_{jkq}$ value is decremented by one after each iFrame is sent to switch fabric 102.

When an SQPP Update (i.e., a PQS Update or an AAQST Update) is received from switch fabric 102, the $PQS_{jkq}$ values in the $PAQST_j$ table are incremented accordingly. Receipt of an SQPP Update implies that switch fabric 102 has forwarded previously sent iFrames, thereby opening storage space for additional iFrames in the cross-point queues of switch fabric 102.

The $j^{th}$ line card $LC_j$ periodically sends an $AAQST_j$ Synchronization Request to switch fabric 102. The purpose of this request is to calibrate each of the $PQS_{jkq}$ entries of line card $LC_j$ with each of the $AQS_{jkq}$ entries of switch fabric 102. The periodic rate of the AAQST Request is a user-configured parameter, $T_{sync}$. When the line card $LC_j$ transmits an $AAQST_j$ Request, this line card $LC_j$ must stop transmitting iFrames to switch fabric 102 until after the line card $LC_j$ receives the requested $AAQST_j$ table and updates the $PAQST_j$ table.

The $AAQST_j$ table sent by switch fabric 102 has the format defined above by Table 1. The $AAQST_j$ table is transmitted from switch fabric 102 to line card $LC_j$ in an iFrame having the format set forth in FIG. 7A. After receiving an $AAQST_j$ table from switch fabric 102, the $j^{th}$ line card $LC_j$ updates $PAQST_j$ table by setting $PQS_{jkq}=AQS_{jkq}$ (for k=1 to 16 and q=1 to 4).

If line card $LC_j$ does not receive a response to the $AAQST_j$ Request for a predetermined time period, $T_{timeout}$, then the line card $LC_j$ considers the request expired, and resumes sending iFrames. Another $AAQST_j$ Request is then sent after another $T_{sync}$ period elapses (not counting the $T_{timeout}$ period) The $T_{timeout}$ period is a user-configured parameter.

In addition, the $j^{th}$ line card $LC^j$ can request an $AAQST_j$ table at other times. For example, line card $LC_j$ could use a queue watermark configured to trigger an $AAQST_j$ Update Request when any $PQS_{jkq}$ entry is less than or equal to 1.

The $j^{th}$ line card $LC_j$ is allowed to send a multi-cast iFrame to switch fabric 102, if queue space is available in the required cross-points addressed by the multi-cast address. For instance, a multi-cast iFrame can be defined as having a QoS class of q, and r egress switch ports as multi-cast branches. These egress switch ports can be identified as ports $k.sub.1, \ldots, k_r$. The $j^{th}$ line card $LC_j$ is allowed to send the multi-cast iFrame only if the $PAQST_j$ table includes the following entries: $PQS_{j\,(k1)q}>0, \ldots, PQS_{j(kr)q}>0$. When the multi-cast iFrame is sent, the $PQS_{j(k1)q}, \ldots, PQS_{j(kr)q}$ values are each decremented by one.

As an exception, line card $LC_j$ can be configured to send iFrames to switch fabric 102, even though the $PAQST_j$ table predicts that there is no available queue space in switch fabric 102. The consequence is that the iFrame can be lost in switch fabric 102. Since each QoS class has its own queue in switch fabric 102, the loss of an iFrame in one QoS class will not impact the other QoS classes.

In accordance with another embodiment, the cross-point buffer depth (e.g., 6 in the described examples), is a software configurable parameter. In this embodiment, multiple cross-point buffer depths are supported. Thus, smaller cross-point buffer depths can be used for delay sensitive services like Constant Bit Rate (CBR) and Time Domain Multiplexed (TDM) services that are given a high QoS priority to guarantee that the data is forwarded quickly. Larger cross-point buffer depths can be used when implementing time insensitive services that are given a lower QoS priority, such as Unspecified Bit Rate (UBR) service. There are no time delay guarantees for UBR services. UBR service is sometimes called "best effort", indicating that there is no guaranteed forwarding delay, but is instead handled as well as possible with the circumstances at the moment. UBR is forwarded during otherwise idle periods, when no other service types are waiting. UBR service is therefore given the lowest priority. Providing a deeper buffer for UBR service can be beneficial. The extra buffer depth can hold more iFrames, so that as many iFrames as possible are ready to be transmitted when idle transmission time becomes available.

In accordance with yet another embodiment, the SQPP protocol can be expanded to include other mechanisms, such as a line card backpressure mechanism that prevents overfilling the output buffer of line card $LC_j$.

Switch Fabric Procedure for SQPP

The procedure for operating the switch fabric 102 in accordance with the SQPP protocol will now be described in more detail.

After initialization, all cross-point buffers are available, i.e., $AQS_{jkq}=M$; for j=1, \ldots, N; k=1, \ldots, N; q=1, \ldots, H (e.g., M=6, N=16 and H=4).

After initialization, all of the cross-point queues in switch fabric 102 are available (i.e., empty). Thus, all of the actual available queue space values ($AQS_{jkq}$) are set to the maximum value of 6. Each time switch fabric 102 receives an iFrame from the $j^{th}$ ingress line card $LC^j$, which is to be routed to the $k^{th}$ egress switch port with a QoS class q, the $AQS_{jkq}$ value is decremented by one.

When switch fabric 102 receives a multi-cast iFrame, multiple AAQST table entries are decremented. For instance, a multi-cast iFrame received from the j.sup.th line card can be defined as having a QoS class of q, and r egress switch ports as multi-cast branches. These egress switch ports can be identified as ports $k_1, \ldots, k_r$. In these conditions, switch fabric 102 subtracts one from each of the $AQS_{j(k1)q}, \ldots, AQS_{j(kr)q}$ values.

Each time that switch fabric 102 transmits an iFrame from the cross-point queue of the $j^{th}$ ingress switch port and the $k^{th}$ egress switch port with the $q^{th}$ QoS class, the corresponding actual queue space entry $AQS_{jkq}$ is incremented by one. When an opportunity arises, switch fabric 102 transmits a PQS Update either as part of an egress User iFrame or as part of an egress PQS Update Control iFrame to the $j^{th}$ ingress line card $LC_j$, thereby informing this line card $LC_j$ of the newly available queue space.

As described in more detail below, switch fabric 102 is designed to handle incoming Control iFrames separate from the User iFrames. This is so that the processing of the Control iFrames is not delayed by the processing of User iFrames. If Control iFrames were forced to wait behind User iFrames in a cross-point queue, then switch fabric 102 may not discover an important Control iFrame in a timely manner.

When multiple PQS Updates are waiting to be transmitted to a line card $LC_j$, switch fabric 102 selects the order in which the PQS Updates are transmitted based on the following priority levels. Update prioritization is only performed between cross-point queues associated with the same ingress switch fabric port (i.e., cross-point queues that receive from the same line card).

Level 1: Cross-point queues with Update_Count greater than 4.

Level 2: Cross-point queues with Update_Count less than 5, and QoS=00.

Level 3: Cross-point queues with Update_Count less than 5, and QoS=01.

Level 4: Cross-point queues with Update_Count less than 5, and QoS=10.

Level 5: Cross-point queues with Update_Count less than 5, and QoS=11.

Update_Count is the number of PQS Updates pending in a cross-point queue associated with the line card $LC_j$. A PQS Update must be sent immediately for each cross-point queue having a Level 1 priority. If multiple PQS Updates having a Level 1 priority are waiting to be sent, one PQS Update Control iFrame is used to simultaneously send all of the Level 1 updates (See, FIG. 8B). The Level 1 PQS Update Control iFrame has priority over User iFrames.

After the PQS Updates having a Level 1 priority have been sent, PQS updates having a Level 2 priority are sent, followed in order by PQS updates having a Level 3 priority, PQS updates having a Level 4 priority, and PQS updates having a Level 5 priority. PQS Updates having Level 2 to Level 5 priorities are transmitted either appended as part of an egress User iFrame, or, when no User iFrames are waiting, as an egress Update Control iFrame. When transmitted as part of an egress User iFrame, the specified Line Card PQS value is incremented by one and the switch fabric cross-point Update Count is decremented by one. When transmitted as an egress Update Control iFrame, the specified Update Count is used to increment the specified line card PQS value and to decrement the specified switch fabric cross-point Update Count.

Implementation of the SQPP Based Switching Architecture

There are different ways to implement the SQPP protocol and switching architecture. This section gives one example implementation.

Line Card Architecture

Figure 9:
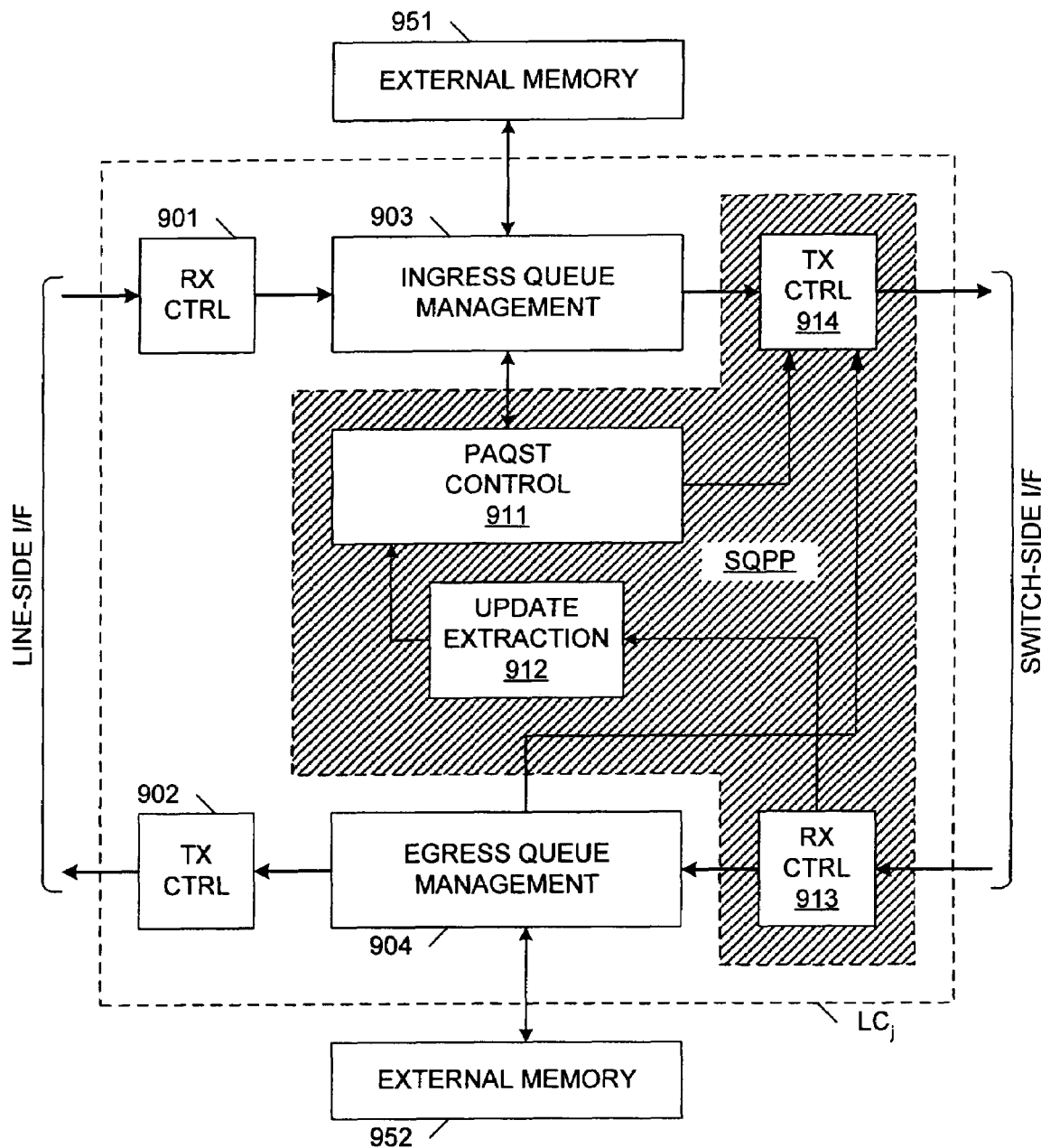
FIG. 9 is a block diagram illustrating a line card architecture in accordance with one embodiment of the present invention.

FIG. 9 is a block diagram illustrating the line card architecture in accordance with one embodiment of the present invention. The line card architecture 900 includes line-side receive controller 901, line-side transmit controller 902, ingress queue management block 903, which is coupled to external memory 951 for input buffering, and egress queue management block 904, which is coupled to external memory 952 for output buffering. Line card architecture 900 also includes four primary functions associated with the SQPP protocol, including: PAQST control block 911, update extraction block 912, switch-side interface receive controller 913, and switch-side interface transmit controller 914. These four SQPP functions 911-914 are described in more detail below.

PAQST Control Block

PAQST control block 911 performs the following functions. First, PAQST control block 911 maintains the PAQST table for the line card. For the 16-port switch fabric 102 with 4 quality of service levels, there are a total of 4*16=64 entries in this table. (See, Table 2 above.) PAQST control block 911 updates the PAQST table entries when iFrames are transmitted to switch fabric 102, or PQS Updates are received from switch fabric 102. PAQST control block 911 receives the PQS Updates from update extraction block 912 through switch-side receive controller 913.

PAQST control block 911 also periodically initiates a synchronization process. The time interval between two consecutive synchronization processes is $T_{sync}$. The synchronization process is implemented by transmitting an AAQST Request to switch fabric 102, thereby causing switch fabric to transmit the AAQST table to the line card. The PAQST control block 911 then updates the PAQST table using the values in the received AAQST table.

PAQST control block 911 also monitors the PAQST table to determine when a queue watermark has been exceeded, and then transmits an AAQST Request to switch fabric 102 in order to obtain the actual queue space values.

Queue Space Update Extraction Block

Update extraction block 912 extracts the PQS Update signals from the User Switching Tag of iFrames received by switch-side receive controller 913. Update extraction block 912 passes these PQS Updates to PAQST control function block 911. Update extraction block 912 also extracts AAQST tables from Control iFrames, and passes these AAQST tables to PAQST control block 911.

Switch-side Interface Receive Controller

Switch-side receive controller 913 detects the start and end of received iFrames. Receive controller 913 also provides a buffer to hold one or two iFrames for processing within this block. Receive controller 913 passes PQS Updates to update extraction block 912. Receive controller 913 also detects Control iFrames, and provides these Control iFrames to update extraction block 912. Receive Controller 913 removes the SQPP User Switching Tag from incoming User iFrames before passing the User payload to the Egress Queue Management block 904.

Switch-side Interface Transmit Controller

The switch-side transmit controller 914 generates Ingress User and Control iFrames. User iFrames are generated by creating a User iFrame Switching Tag for each user data packet received from the Ingress Queue Management block 903 and using the user data as the iFrame User Data (Payload). Ingress Control iFrame signals are generated by the switch-side transmit controller 914 when the PAQST Control block 911 indicates the need for an AAQST Request or when a Purge Control iFrame is required (e.g., after power up). Switch-side transmit controller 914 generates the start and end of transmitted iFrames. Transmit controller 914 also provides a buffer to hold one or two iFrames prior to transmission.

PAQST control block 911 may also predict when one or more switch fabric cross-point queues associated with that line card are full (AQS=0) based on the associated PQS value (PQS=0). When this occurs, the PAQST control block 911 sends a congestion indication signal to the Ingress Queue Management block 903 to not send iFrames for that congested (full) cross-point queue. The Ingress Queue Management block 903 is only allowed to send iFrames for cross-point queues that are not congested. When congestion of a cross-point queue is no longer predicted (Updates have been received for that cross-point queue making PQS>0) then the PAQST control block 911 removes the congestion indication for that cross-point queue and the Ingress Queue Management block 903 is allowed to resume sending iFrames to that cross-point queue.

The Egress Queue Management block 904 may also detect egress queue congestion in the output buffer. Egress congestion is dependent on the size of the output buffer 952 that has been configured for a particular QoS, the rate that the switch-side interface receive controller 913 receives packets for that QoS, and the rate at which the line-side transmit controller 902 transmits the data for that QoS. In general, the output buffer and its mechanisms are not described by the SQPP protocol. The important point, however, is that if egress congestion occurs, a signal is provided from the Egress Queue Management 904 to the SQPP procedures (i.e., transmit controller 914), thereby preventing additional data from being sent until the egress queue congestion is cleared.

Egress queue congestion can be explained as follows. In many cases, the line-side interface of the Line Card (see, e.g., FIG. 9) is slower than the speed of the switch-side interface. For example, the switch-side interface may be designed to support multiple line card types (e.g. a 2.5 Gigabit/sec SONET line card and a 1 Gigabit/second Ethernet line card). If the switch-side interface is designed to support the maximum line card rate, then the output port can become congested when the line-side interface does not run as fast as the switch-side interface. For example if the switch-side interface supplies data at 2.5 Gb/s, but the line-side interface only supports 1 Gb/s, then data can accumulate and potentially overflow in the output buffer 952. The SQPP protocol can be implemented with or without the egress congestion mechanism. Without the mechanism, the chance of dropping packets is higher than if the mechanism is employed. This results in a trade-off between complexity and an increased probability that packets will be lost.

Upon detecting egress queue congestion, egress queue management block 904 sends an egress congestion indication to transmit control block 914. In response, transmit control block 914 may embed an egress congestion indication signal within an outgoing ingress User Switching Tag or within an outgoing ingress Control iFrame. This egress congestion indication signal in one embodiment may be coded using the reserved bits of the ingress User Switching Tag or the Reserved bits of the ingress AAQST Request iFrame. Other coding techniques are also possible using the ingress iFrame headers. Using 2 bits, the egress congestion indication signal can be used to indicate four states: no congestion, congestion on QoS level 2, congestion on QoS level 3, or congestion on QoS level 4. With this scheme, it is assumed that QoS level 1 is time critical and cannot regard a congestion condition so that if congestion occurs, the iFrame data is discarded. In an alternate embodiment, the egress congestion indication signal can be encoded with one bit to indicate a general egress congestion condition. When only one bit is used, the result may be that all egress transmission to the corresponding line card is stopped or that all egress transmission for specific QoS levels is stopped. For example, transmission of QoS levels 1 and 2 may continue to be transmitted, while transmission of QoS levels 3 and 4 are stopped.

The encoded egress congestion indication transmitted from the line card (destination line card) to the switch fabric 102 stops the switch fabric 102 from transmitting more data to the destination line card, because the destination line card output buffer 962 cannot accept any more data. If a line card (source line card) attempts to send iFrames to the congested destination line card while the egress congestion indication signal for the destination line card is active, the PQS count in the source line card will eventually reach a "0" value (e.g., after sending 6 iFrames, or when the cross-point queue in the switch fabric 102 becomes full). When the source line card's PQS value becomes "0", the source line card stops sending iFrames for the destination line card. When the destination line card is able to remove the egress congestion by transmitting data from the output buffer 952 to the line-side interface, egress queue management 904 de-asserts the egress congestion indication signal. In response, the switch side transmit controller 914 transmits an encoded signal to the switch fabric 102, thereby indicating that the egress congestion condition has been removed. At this time, the switch fabric 102 is allowed to resume sending iFrames to the destination line card, and in turn sends PQS updates to the source line card for those iFrames. When the source line card begins receiving PQS Updates for that destination line card, the corresponding PQS value in the source line card increments to a value greater than "0", thus allowing the source line card to resume sending iFrames to the switch fabric 102 for that destination line card.

Switch Fabric Architecture

Figure 10:
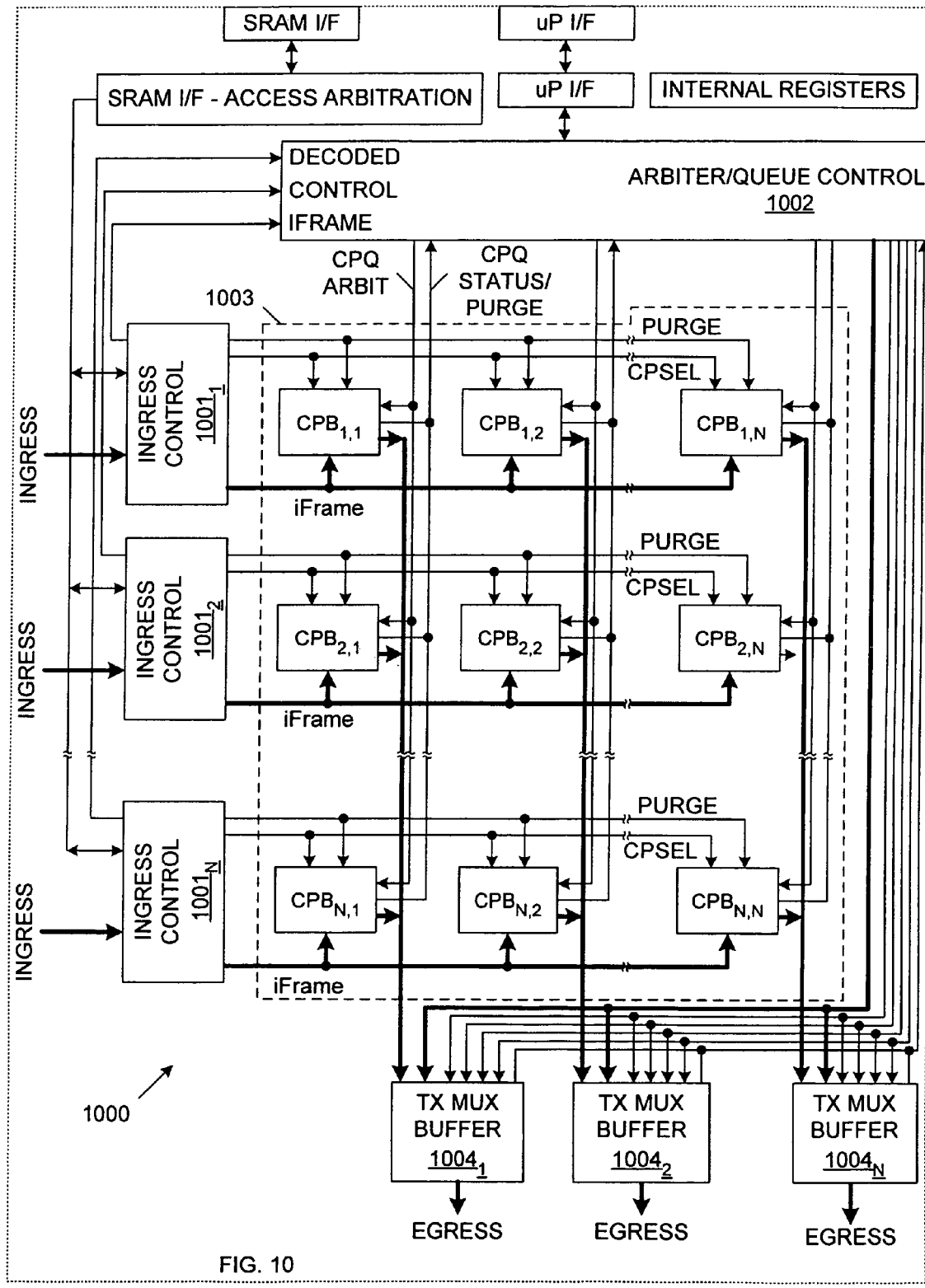
FIG. 10 is a block diagram illustrating a switch fabric architecture in accordance with one embodiment of the present invention.

FIG. 10 is a block diagram illustrating the switch fabric architecture 1000 in accordance with one embodiment of the present invention. The switch fabric architecture 1000 includes ingress control function blocks $1001_1$-$1001_N$, . . . arbiter/queue control unit 1002, cross-point queue block 1003, and transmit multiplexers/buffers $1004_1$-$1004_N$.

Ingress Control Function Block

Each of ingress control function blocks $1001_1$-$1001_N$ detects the start of an iFrame signal and the end of an iFrame signal for each of the incoming iFrames. In addition, each of ingress control function blocks $1001_1$-$1001_N$ provides a buffer to temporarily hold one or two iFrames for further processing. Each of blocks $1001_1$-$1000_N$ also decodes the User Switching Tag of each received iFrame, thereby enabling each block to generate a cross-point queue select signal (CPSEL), which is used to select the proper cross-point queue (according to the egress switch port address and QoS class). For example, ingress control function block $1001_1$ decodes each iFrame received from line card $LC_1$, and in response, generates the CPSEL signal, which is applied to cross-point buffers $CPB_{1,1}$-$CPB_{1,N}$. The CPSEL signal enables one (uni-cast) or more (multi-cast) of these cross-point buffers to store the iFrame. The CPSEL signal also selects the appropriate cross-point queue within the selected cross-point buffer, in accordance with the QoS class identified by the iFrame.

Each of ingress control function blocks $1001_1$-$1001_N$ transmits the iFrames to the corresponding row of cross-point buffers in cross-point switch 1003. For example, ingress control function block 10001, transmits received iFrames to cross-point buffers $CPB_{1,1}$-$CPB_{1,N}$. The iFrames are written to the cross-point buffers (queues) selected by the CPSEL signal. These cross-point queues are hereinafter referred to as the destination cross-point queues.

The Ingress Control blocks $1001_1$-$1001_N$ pass the MCID of an ingress multi-cast user iFrame to the SRAM interface block. The MCID is used as an address for performing a read operation on an external SRAM. The data that is retrieved from the SRAM is returned to the same Ingress Control block $1001_1$-$1001_N$ that originated the Read operation. The returned data indicates which cross-point queues to which the ingress multi-cast user iFrame is to be forwarded.

Each of the ingress control function blocks $1001_1$-$1000_N$ informs arbiter/queue controller 1002 when each destination cross-point queue receives a new iFrame. For a multi-cast iFrame, each of the destination cross-point queues is considered to have received a new iFrame.

In addition, each of the ingress control function blocks $1001_1$-$1001_N$ processes any control commands embedded in the User Switching Tags of the received iFrames, including generating cross-point purge signals (PURGE), and passing any AAQST Update Requests or Backpressure commands to arbiter/queue controller 1002.

Arbiter/Queue Control Unit

Arbiter/Queue Control Unit 1002 handles the egress switch port arbitration and AAQST processing required by the SQPP protocol. Arbiter/Queue Control Unit 1002 performs the following tasks.

Arbiter/Queue Control Unit 1002 maintains one $AAQST_j$ table for each of the j switch fabric ports. For the 16-port switch fabric 102, there are 16 $AAQST_j$ tables, each with 4*16=64 cross-point queues or a total of 64*16=1024 cross-point queues for the entire AAQST table. An example of one $AAQST_j$ table is provided above in Table 1.

Arbiter/Queue Control Unit 1002 determines the unused length of each cross-point queue from the AAQST table. For instance, the queue at the cross-point of ingress switch port 1 and egress switch port 1 having QoS class 1 ($AQS_{111}$) may have a value of 6.

Arbiter/Queue Control Unit 1002 updates the AAQST table entries when iFrames are received or transmitted. As described above, Arbiter/Queue Control Unit 1002 is informed when ingress control blocks $1001_1$-$1001_N$ receive iFrames. As described below, Arbiter/Queue Control Unit 1002 controls the transmission of iFrames from the cross-point queues to the egress switch ports, and thereby knows when iFrames are transmitted.

The arbiter function of Arbiter/Queue Control Unit 1002 can be logically divided into 16 independent sub-arbiters. In this case, each sub-arbiter serves one egress switch port. Each sub-arbiter will arbitrate among the 16 buffers along the egress switch port. For example, one sub-arbiter may arbitrate among the sixteen cross-point buffers $CPB_{1,1}$-$CPB_{N,1}$. Different scheduling algorithms can be utilized. For instance, weighted round robin scheduling can be used for some QoS classes, while calendar based scheduling can be used for other QoS classes. A priority scheduling policy can be applied across different QoS classes so that higher priority QoS classes receive service before lower priority QoS classes. For the arbitration algorithm, only iFrames stored in the cross-point queues can be scheduled. In other words, an iFrame cannot be received and transmitted in the same cycle.

Arbiter/Queue Control Unit 1002 also generates and sends PQS Updates to the line cards $LC_1$-$LC_6$. The PQS Updates are sent to the Transmit Multiplexer/Buffer circuits $1004_1$-$1004_N$ via an Update iFrame path. Each sub-arbiter schedules the order in which PQS Updates are returned to the line cards $LC_1$-$LC_{16}$. When multiple PQS Updates are waiting to be returned, PQS Updates for higher priority QoS classes are returned first. Similar algorithms that are used for scheduling iFrames queues can be used to schedule the returned PQS updates.

Arbiter/Queue Control Unit 1002 also generates and sends Control iFrames to indicate the current $AAQST_k$ table values when requested by incoming Control iFrames. Arbiter/Queue Control Unit 1002 generates the $AAQST_k$ table to be sent back to the $k^{th}$ line card in the same manner illustrated by Table 1 above.

Arbiter/Queue Control Unit 1002 also generates arbitration signals (CPQ ARBIT) to select which cross-point queue is to transmit an iFrame.

Cross-Point Queue Block

Each of cross-point buffers $CPB_{1,1}$-$CPB_{N,N}$ performs the following functions. Each of cross-point buffers $CPB_{1,1}$-$CPB_{N,N}$ selected by a CPSEL signal reads the iFrames provided on a data bus by the corresponding one of ingress control blocks $1001_1$-$1001_N$, and queues these iFrames according to their QoS class.

Each of cross-point buffers $CPB_{1,1}$-$CPB_{N,N}$ writes a queued iFrame onto a corresponding data bus when selected by arbiter/queue controller 1002.

Each of cross-point buffers $CPB_{1,1}$-$CPB_{N,N}$ purges its cross-point queues upon receiving a PURGE signal from its corresponding ingress control block.

Finally, each of cross-point buffers $CPB_{1,1}$-$CPB_{N,N}$ provides delineation between two iFrames.

Transmit Multiplexer/Buffer Circuits

Each of transmit multiplexer/buffer circuits $1001_1$-$1000_N$ performs the following functions.

Each of transmit multiplexer/buffer circuits $1001_1$-$1001_N$ generates the start/end of iFrame signal for each transmitted iFrame. Each of transmit multiplexer/buffer circuits $1001_1$-$1000_N$ also provides a buffer to temporarily hold one or two iFrames for transmission. Moreover, each of transmit multiplexer/buffer circuits $1001_1$-$1001_N$ receives PQS Updates from the arbiter/queue controller 1002, and appends these PQS Updates onto the PQS Update field of the User Switching Tag of iFrames, as the iFrames are transmitted.

Matrixed Memory Array Device

Figure 11:
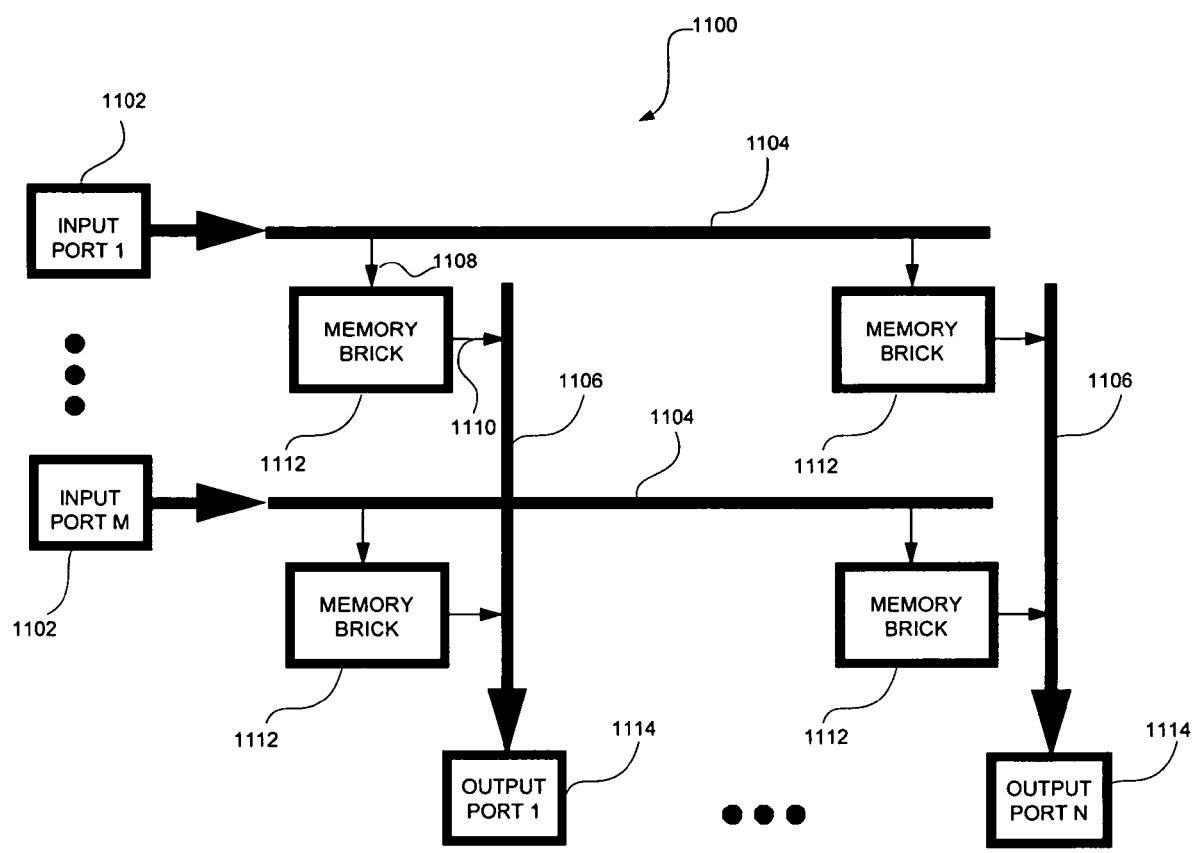
FIG. 11 illustrates a block diagram of a matrixed memory array device that includes memory bricks located at the cross-point of the first data buses and the second data buses in accordance with an embodiment of the present invention.

Referring to FIG. 11, a block diagram of a matrixed memory array device 1100 is disclosed that has memory bricks switchably coupling input ports to output ports separate and different from input ports. Each memory brick is reserved only to one input port and only one output port. The Input port is coupled and dedicated to a first data bus; and output port is coupled to and dedicated to a second data bus. First data buses further include input data buses and second data buses further include output data buses.

More particularly, matrixed memory array device 1100 includes a plurality of input ports 1102, a plurality of first data buses 1104, a plurality of second data buses 1106, a plurality of memory bricks 1112, and a plurality of output ports 1114. Input data buses 1108 couple memory bricks 1112 to input ports 1102. First data buses 1104 are different and separate from second data buses 1106. Memory brick 1112 is placed at the cross-point between first data buses 1104 and second data bus 1106 so that each memory brick is reserved to only one input port 1102 and only one output port 1114. Thus, memory brick 1112 can switchably couple frames of data from input ports 1102 to output ports 1114. Each memory brick 1112 can store, erase, read, write, and switchably couple frames of data from input port 1102 to corresponding output port 1114.

Output data buses 1110 couple memory bricks 1112 to output ports 1114. Output data buses 1110 are different and separate from input data buses 1108.

Referring again to FIG. 11, matrixed memory array device 1100 has separate input ports 1102 and output ports 1114. Memory brick 1112 is reserved only to one input port 1102 and only one output port 1114. Input port 1102 is coupled and dedicated to first data bus 1102; and output port 1114 is coupled to and dedicated to second data bus 1106. First data buses 1104 further include input data buses 1108. Second data buses 1106 further include output data buses 1110.

Matrixed memory array device 1100 can be used in asynchronous communication systems in which input data rate is different from output data rate. Such asynchronous communication systems include SQPP architecture 100 shown in FIG. 2. Because each memory brick 1112 can store, erase, read, and switchably couple frames of data from the selected input ports 1102 to selected output ports 1114, matrixed memory array device 1100, when used as a switch fabric, can manage and alter priorities of the frames of data. This results in reduced clock rate, reduced error and improved efficiency. In the described embodiment as shown in FIG. 2, during the periodical re-synchronization process, each $AQS_{jkq}$ value stored in memory brick 1112 can be changed to the value of $PQS_{jkq}$. Moreover, the Head of Line Blocking (HOL) problems commonly encountered in conventional line card switching systems are avoided because data packets are divided into smaller frames of data which are stored in memory bricks 1112 and then forwarded to output ports 1114.

Figure 12:
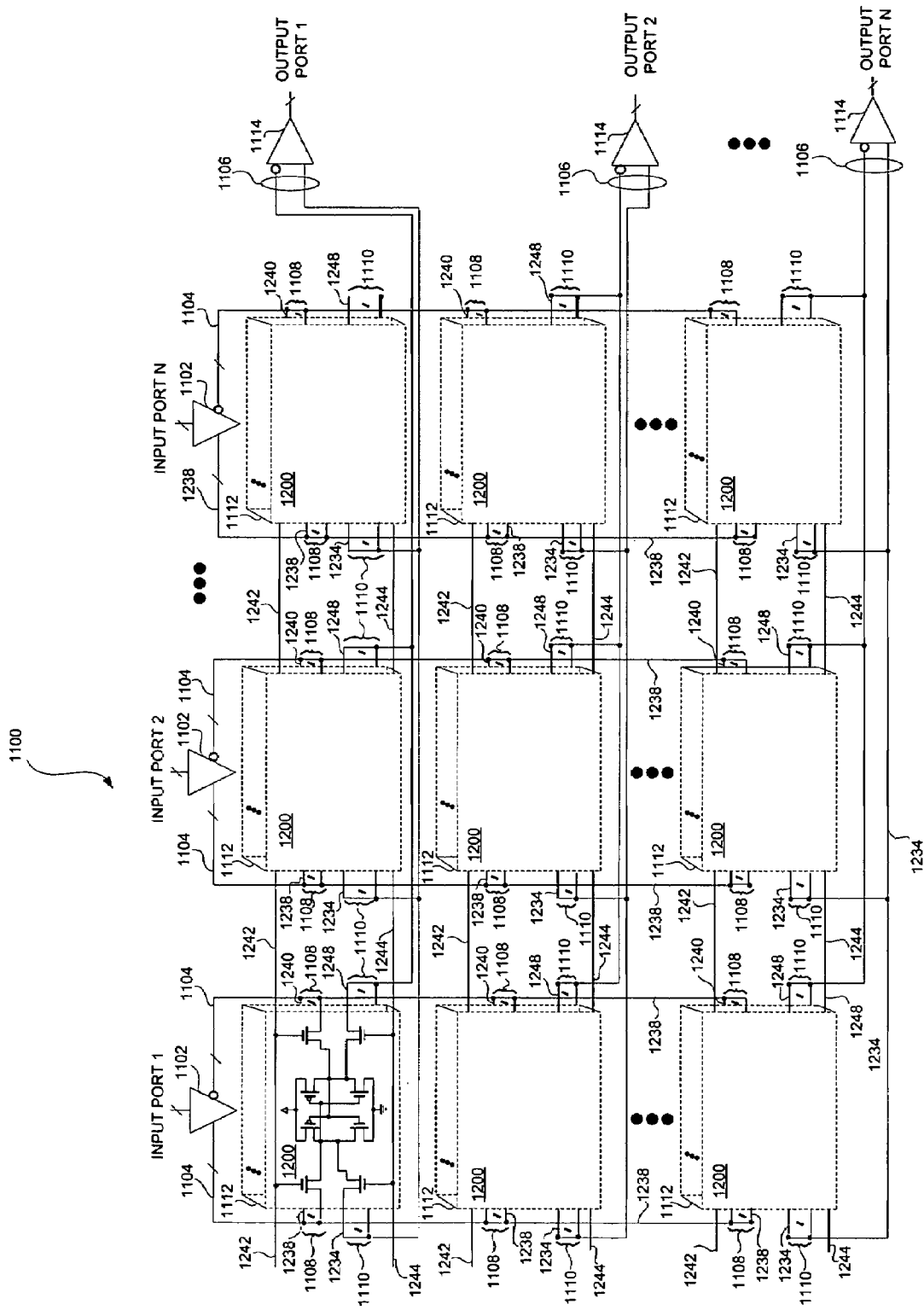
FIG. 12 illustrates the interconnections and the structure of the matrixed memory array device of FIG. 11, showing memory bricks that include multiple 8 transistor (8-T) memory cells in accordance with an embodiment of the present invention.

FIG. 12 illustrates another embodiment of matrixed memory array device 1100 in which each memory brick 1112 further includes a plurality of eight transistor (8-T) Static Random Access Memory (SRAM) memory cells 1200 (hereinafter referred to as "8-T memory cell 1200"). Each 8-T memory cell 1200 can store a data bit and switchably couples this data bit from input port 1102 to corresponding output port 1114. Data bits contained in frames of data can be read from, written to, and erased from each 8-T memory cell 1200.

Each 8-T memory cell 1200 includes an input terminal 1238, a complement input terminal 1240, an input enable terminal 1242, an output terminal 1234, a complement output terminal 1248, and an output enable terminal 1244. In one embodiment, input terminals 1238 and complement input terminals 1240 of all 8-T memory cells 1200 in memory brick 1112 are bus interconnected to form input data bus 1108. Input data buses 1108 of each memory brick 1112 are coupled to first data bus 1104 and to input ports 1102. All output terminals 1234 and complement output terminals 1248 of all 8-T memory cells 1200 of memory brick 1112 form output data bus 1110. Output data buses 1110 are coupled to second data buses 1106 and to output ports 1114. Input enable terminals 1242 of 8-T memory cells 1200 within a row of matrixed memory array device 1100 are electrically coupled together. Output enable terminals 1244 of 8-T memory cells 1200 within a row of matrixed memory array device 1100 are electrically coupled together. With such architecture and connections, any specific input column or output row of 8-T memory cells 1200 can be selected.

Referring again to FIG. 12, specific 8-T memory cell 1200 of the first row and first column (one with detailed schematic of 8-T memory cell) can be selected by turning on input enable terminal 1242 to write to, or output enable terminal 1244 of the first row to read from specific 8-T memory cell 1200. Once specific 8-T memory cell 1200 is selected, input port 1102 of the first column of matrixed memory array device 1100 can also be selected. Because any particular 8-T memory cell 1200 can be selected, any particular memory brick 1112 can also be selected. Therefore, a data bit can be stored in, read from, erased and switchably coupled out of particular 8-T memory cell 1200. Similarly, frames of data can be stored in, read from, erased and switchably coupled from each memory brick 1112.

Matrixed memory array device 1100 has separate input ports 1102 and output ports 1114. Each memory brick 1112 is reserved only to one input port 1102 and only one output port 1114. Input port 1102 is coupled and dedicated to first data bus 1102; and output port 1114 is coupled to and dedicated to second data bus 1106. First data buses 1104 are comprised of input data buses 1108. Input data buses 1108 are further comprised of the combination of input terminals 1238 and complement input terminals 1240 of 8-T memory cells 1200. Second data buses 1106 comprised of output data buses 1110. Output data buses 1106 are made of output terminals 1234 and complement output terminals 1248 of 8-T memory cells 1200. In one embodiment, each input port 1102 is coupled to 8-T memory cell 1200. Thus, frames of data received at selected input ports 1102 can be coupled to 8-T memory cells 1200.

Figure 13:
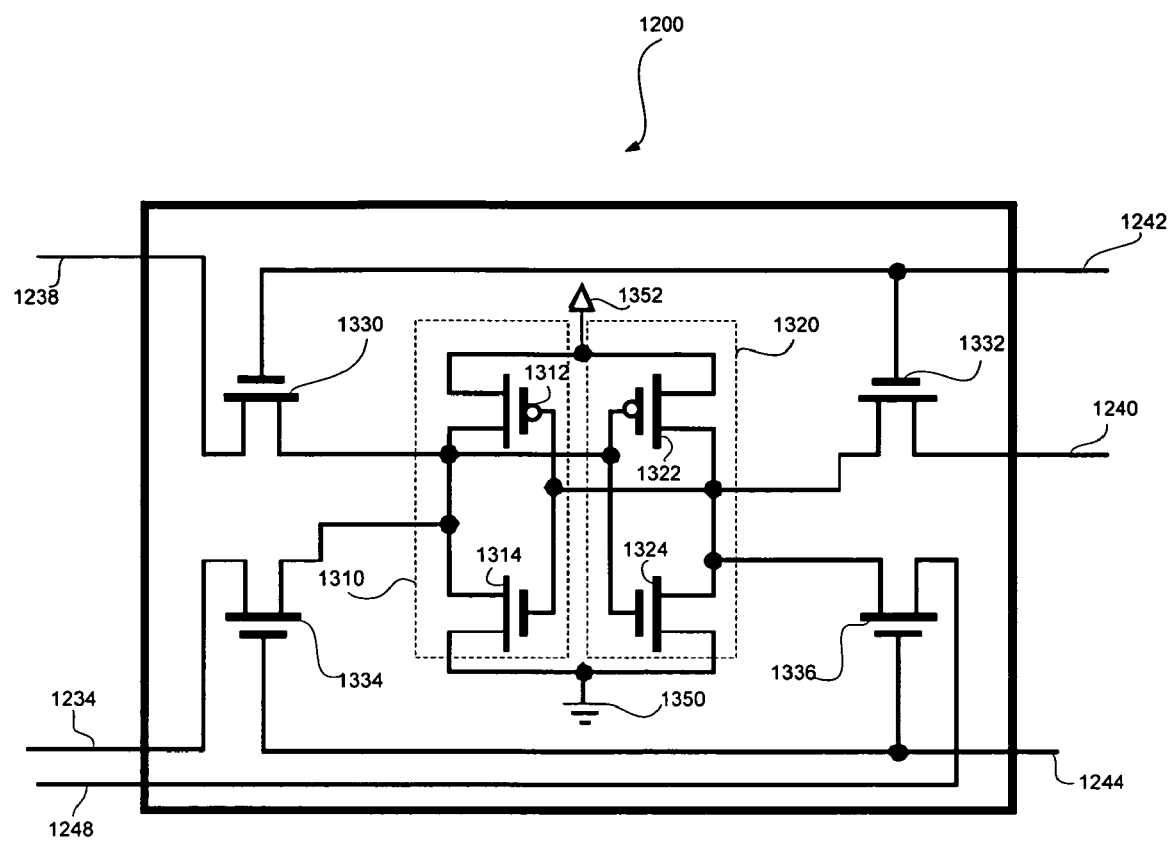
FIG. 13 shows a schematic diagram of an 8-T memory cell that can be used in each memory brick in accordance with an embodiment of the present invention.

Now referring to FIG. 13, a schematic diagram of 8-T SRAM memory cell 1200 within memory brick 1112 is illustrated. 8-T SRAM memory cell 1200 includes a first Field Effect Transistor (FET) inverter 1310 coupled to a second FET inverter 1320 to form a set-reset (RS) flip-flop type memory cell. More particularly, the output of first FET inverter 1310 is coupled to the input of second FET inverter 1320, and the input of first FET inverter 1310 is coupled to the output of second FET inverter 1320. To store logic 0 or LOW, the input of first FET inverter 1310 is set to logic 0. Its output has logic 1 or HIGH. Consequently, the input of second FET inverter 1320 is 1 and its output has logic 0. Thus, logic LOW or 0 is stored in the memory cell formed by first FET inverter 1310 and second FET inverter 1320. On the other hand, to store logic 1 or HIGH, the input of first FET inverter 1310 is set to logic 1, and its output has logic 0. The input of second FET inverter 1320 has logic 0 and its output has logic 1. Thus, logic HIGH or 1 is stored in the memory cell formed by first FET inverter 1310 and second FET inverter 1320.

First FET inverter 1310 has a pull-up FET transistor 1312 coupled in series to a pull-down FET transistor 1314. The gate of pull-up FET transistor 1312 electrically coupled to the gate of pull-down transistor 1314 to form the input of first FET inverter 1310. The drain of pull-up FET transistor 1312 is coupled to the source of pull-down FET transistor 1314 to form the output of first FET inverter 1310.

Similarly, second FET inverter 1320 has a pull-up FET transistor 1322 coupled in series to a pull-down FET transistor 1324. The gate of pull-up FET transistor 1322 electrically coupled to the gate of pull-down FET transistor 1324 to form the input of second inverter 1320, which is coupled to the output of first inverter 1310. The drain of pull-up FET transistor 1322 coupled to the source of pull-down FET transistor 1324 to form the output of second FET transistor 1320, which is coupled to the input of first FET inverter 1310. The source of pull-up transistor 1322 of second FET inverter 1320 electrically coupled the source of pull-up FET transistor 1312 of first FET inverter 1310 and to supply voltage 1352. The drain of pull-down transistor 1324 of second FET inverter 1320 electrically coupled to the drain of pull-down transistor 1314 of first FET inverter 1310 and to electrical ground 1350.

Referring again to FIG. 13, 8-T memory cell 1200 also includes an input enable FET switch 1330, an complement input enable FET switch 1332, an output enable FET switch 1334, and an complement output enable FET switch 1336.

The drain of input enable FET switch 1330 forms input terminal 1238. The source of input enable FET switch 1330 is coupled to the output of first FET inverter 1310 and the input of second FET inverter 1320. The gate of input enable FET switch 1330 is coupled to the gate of complement input enable FET switch 1332 to form input enable terminal 1242. The source of complement input enable FET switch 1332 is coupled to the input of first FET inverter 1330 and the output of second FET inverter 1332. The drain of complement input enable FET switch 1332 forms complement input terminal 1240.

The drain of output enable FET switch 1334 forms output terminal 1234. The source of output enable FET switch 1334 is coupled to the output of first FET inverter 1310. The gate of output enable FET switch 1334 is coupled to the gate of complement output enable FET switch 1336 to form complement output enable terminal 1244. The source of complement output enable FET switch 1336 is coupled to the output of second FET inverter 1320. Finally, the source of complement output enable FET switch 1336 forms complement output terminal 1248. Within memory brick 1112, output terminals 1234 and complement output terminals 1248 of 8-T transistors 1200 form output data buses 1110 while input terminals 1238 and complement input terminals 1240 form input data buses 1108.

Referring still to FIG. 13, when input enable terminal 1242 is ON (HIGH), input enable FET switch 1330 and complement input enable FET switch 1332 are turned ON. If input terminal 1238 is 1 or HIGH, the input of second FET inverter 1320 is forced HIGH, its output is LOW. Thus, complement input terminal 1240 is LOW. In response, the input of first FET inverter 1310 is LOW, and its output is HIGH. If output enable data line 1244 is ON, this enables the retrieval of the stored data bit in 8-T memory cell 1200. Thus, output terminal 1234 is HIGH and complement output terminal 1248 is LOW. A logic HIGH data bit is stored in the 8-T memory cell 1200. Alternatively, when input terminal 1238 is 0 or LOW, the input of second FET inverter 1320 is LOW, its output is HIGH. In response, the input of first FET inverter 1310 is HIGH and its output is LOW. As a result, output terminal 1234 is LOW and complement output terminal 1248 is HIGH if complement output terminal 1248 is ON (HIGH). To rewrite a data bit stored in any particular 8-T memory cell 1200, input terminal 1238 is set to the desired logic state. In particular, when input terminal 1238 is HIGH, the input of second FET inverter 1320 is HIGH and its output is LOW. Complement input terminal 1240 has logic LOW. This sets the input of first FET inverter to LOW and its output to a HIGH. To rewrite this logic HIGH data bit to logic LOW, input terminal 1238 is set to logic LOW. This would bring 8-T memory cell 1200 to logic LOW state, thus rewriting the previous HIGH or 1 logic state to logic LOW state. To erase data bit stored in 8-T memory cell 1200, input terminal 1238 is set to logic LOW and complement input terminal 1240 to logic HIGH. In the same vein, the contents of memory bricks 1112 can be erased by setting input terminals 1238 all to logic 0 or complement input terminal 1240 to logic 1 and scanning all enable lines 1242. Thus, each 8-T memory cell 1200 in memory brick 1112 in accordance with the present invention is capable of storing and switchably coupling data from input port 1104 to output port 1114. Data bits can be read from, written to, and erased from each 8-T memory cell 1200.

Figure 14:
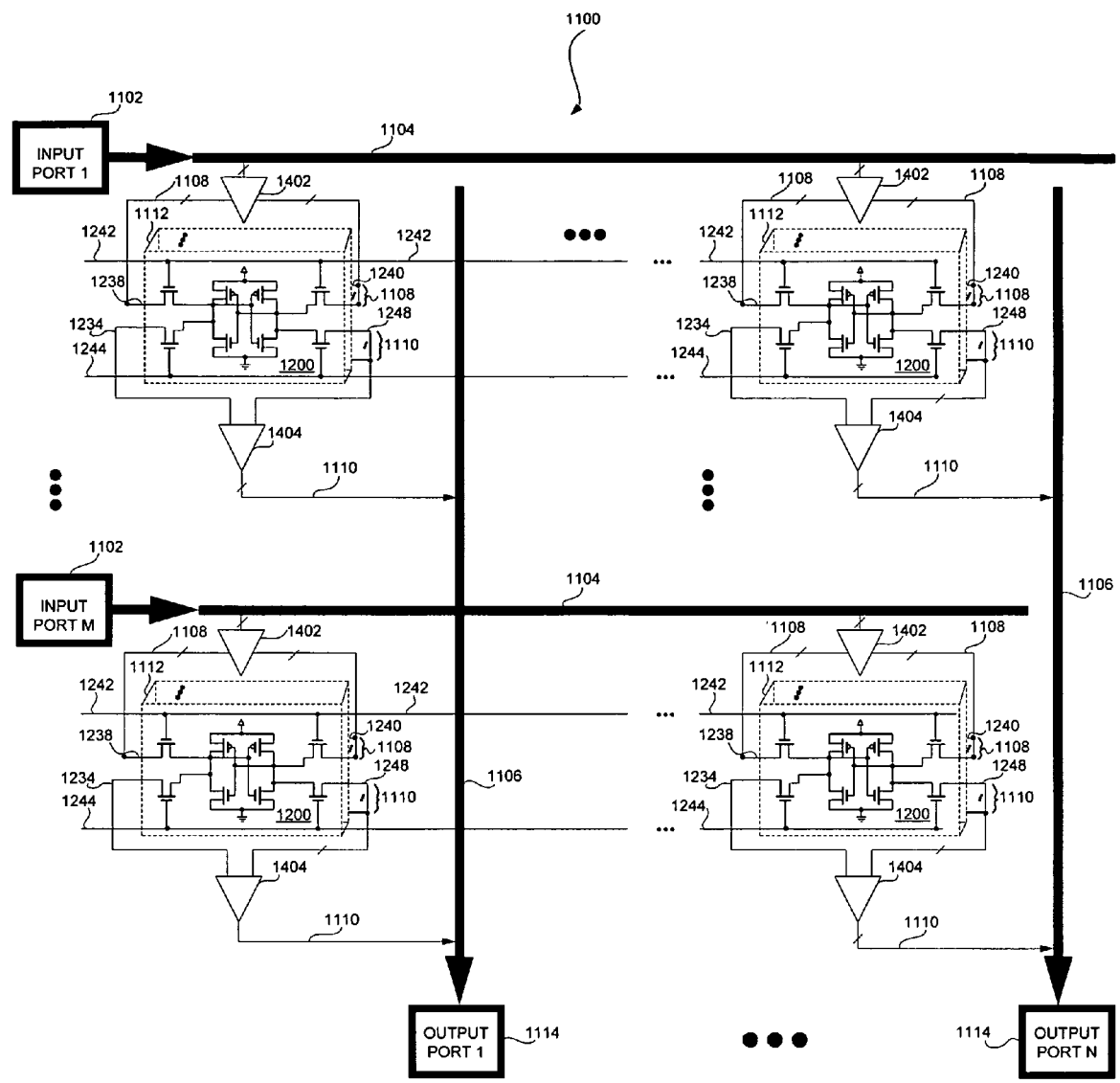
FIG. 14 shows a schematic diagram of a matrixed memory array device that includes a drive amplifier coupled to input data bus and that includes sense amplifier coupled to output data bus for every memory brick.

FIG. 14 is a block diagram illustrating matrixed memory array device 1100 in which a drive amplifier 1402 is coupled to input data bus 1108 and a sense amplifier 1404 is coupled to output data bus 1110 of every memory brick 1112. Drive amplifier 1402 sets signal strength of data bits of frames of data, especially in SQPP architectures 100 described above where signals have to travel a long distance from one of line cards $LC_1$-$LC_{16}$ to switching card 101. In some multi-board systems, line cards $LC_1$-$LC_{16}$ and matrixed memory array device 1100 are located on different circuit boards because there are different users from different locations.

Sense amplifiers 1404 are coupled to output data buses 1110 to amplify the outputs of 8-T memory cells in each memory brick 1112. Sense amplifiers 1404 allow for a reduced voltage swing of inverters 1310 and 1320, which helps to reduce both the delay and the power dissipation. Sense amplifier 1404 compensates for the restricted fan-out driving capability of 8-T memory cells 1200 within memory brick 1112.

Figure 15:
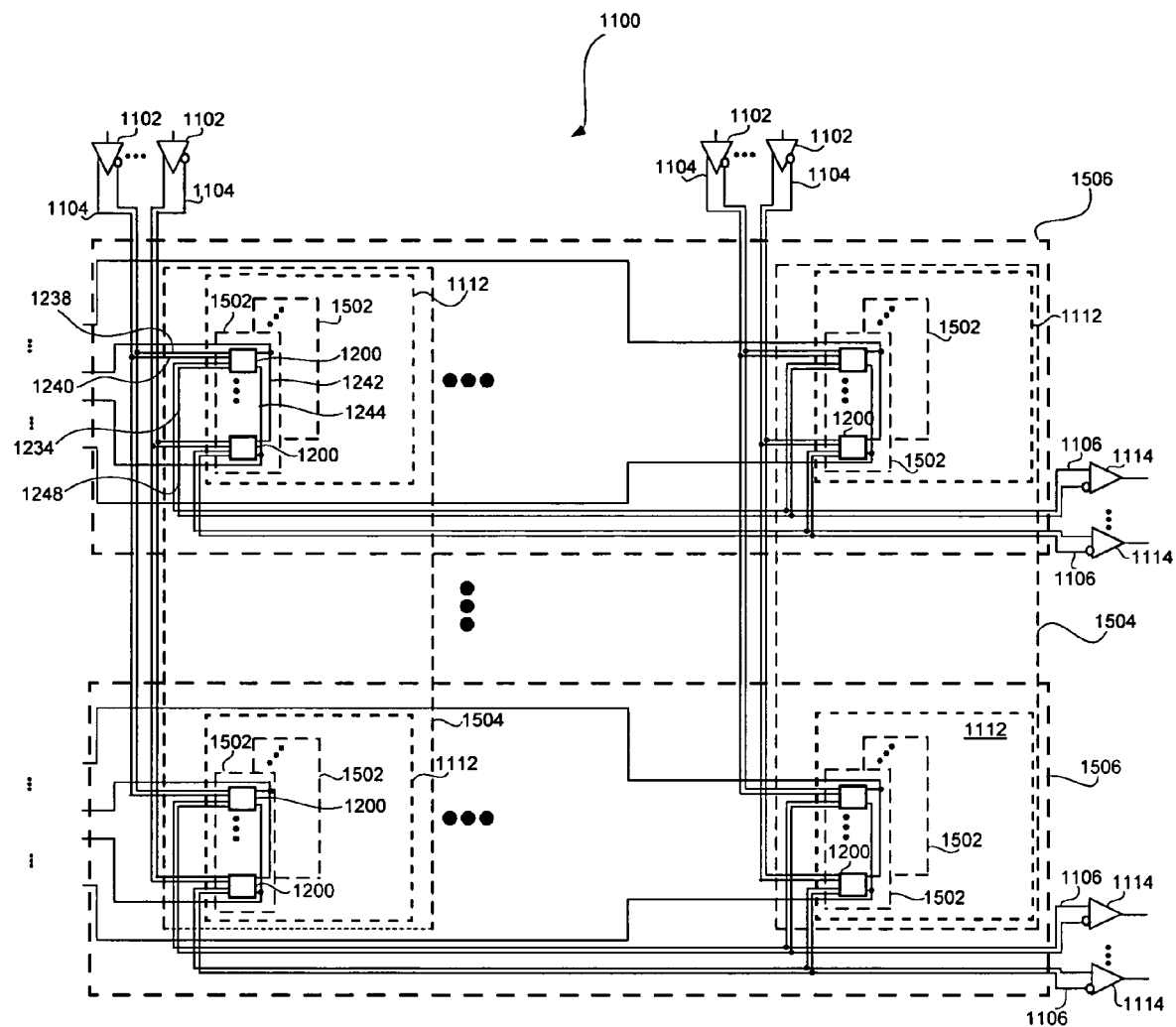
FIG. 15 illustrates an embodiment in which the structure of the matrixed memory array device contains input data blocks and output data blocks and in which each memory brick stores data words, with each data word stored in 8-T SRAM memory cells in accordance with an embodiment of the present invention.

FIG. 15 shows interconnections of 8-T memory cells 1200 between memory bricks of matrixed memory array device 1100. Memory bricks 1112 within a column of matrixed memory array device 1100 form an input data block 1504. Memory bricks 1112 within a row form output data block 1506.

As shown in FIG. 15, within memory brick 1112, 8-T memory cells are grouped into data words 1502. In one embodiment, each word 1502 contains 8 bits or eight 8-T memory cells 1200. Alternatively, data word 1502 can have 16 data bits, 32 data bits or some other number of data bits. Within data word 1502, input enable terminals 1242 of all eight 8-T memory cells 1200 are coupled together and output enable terminals 1244 are coupled together. Input enable terminals 1242 and output terminals 1244 are controlled by address decoder which is controlled by Actual Available Queue Space Table (AAQST) and Predictive Available Queue Space Table (PAQST). The rows of matrixed memory array device 1100 form output data block 1506. In output data block 1506, output terminals 1234 and complement output terminals 1248 of 8-T memory cells 1200 of the same bit position within data word 1502 are coupled together and to output ports 1114. Output terminals 1234 and complement output terminals 1248 of 8-T memory cells 1200 of bits 1 within output data block 1504 are coupled together and to output port 1114. Output terminals 1234 and complement output terminals 1248 of 8-T memory cells 1200 of bit 7 within output data block 1504 are coupled together and to output port 1114. The columns of matrixed memory array device 1100 form input data block 1504. Input terminals 1238 and complement input terminals 1240 of 8-T memory cells 1200 of the same bit position in input data block 1504 are coupled together and to input ports 1102. Input terminals 1238 and complement input terminals 1240 of 8-T memory cells 1200 of bits 1 within input data block 1502 are coupled together and to input 1102. Input terminals 1238 and complement input terminals 1240 of 8-T memory cells 1200 of bit 7 within input data block 1502 are coupled together and to input port 1102. Within memory brick 1112, 8-T memory cells 1200 are interconnected as shown in FIG. 12 and FIG. 13.

The interconnects between 8-T memory cells, as illustrated in FIGS. 12, 13 and 15, enable matrixed memory array device 1100 to have first data buses 1104 separate and different from second data buses 1106. Furthermore, each 8-T memory cell 1200 can switchably couple a data bit from input ports 1102 to output ports 1114. Thus, each memory brick 1112 can store, erase, read, and switchably couple frames of data from input ports 1102 to output ports 1114. In one embodiment, the collection of sense amplifiers 1404 associated with output data block 1506 are organized together to form output port 1114.

Referring to FIG. 15 again, in one particular embodiment of the present invention, each memory brick 1112 includes a plurality of bits acting as service queues. Each service queue supports a different quality of service (QoS). Each of service queues includes one data word 1502 or a group of data words 1502. The size of service queues are designed to provide timing relief for packets being routed from input ports 1102 through output ports 1114 via memory bricks 1112. Service queues can be read independently from data frames.

Figure 16:
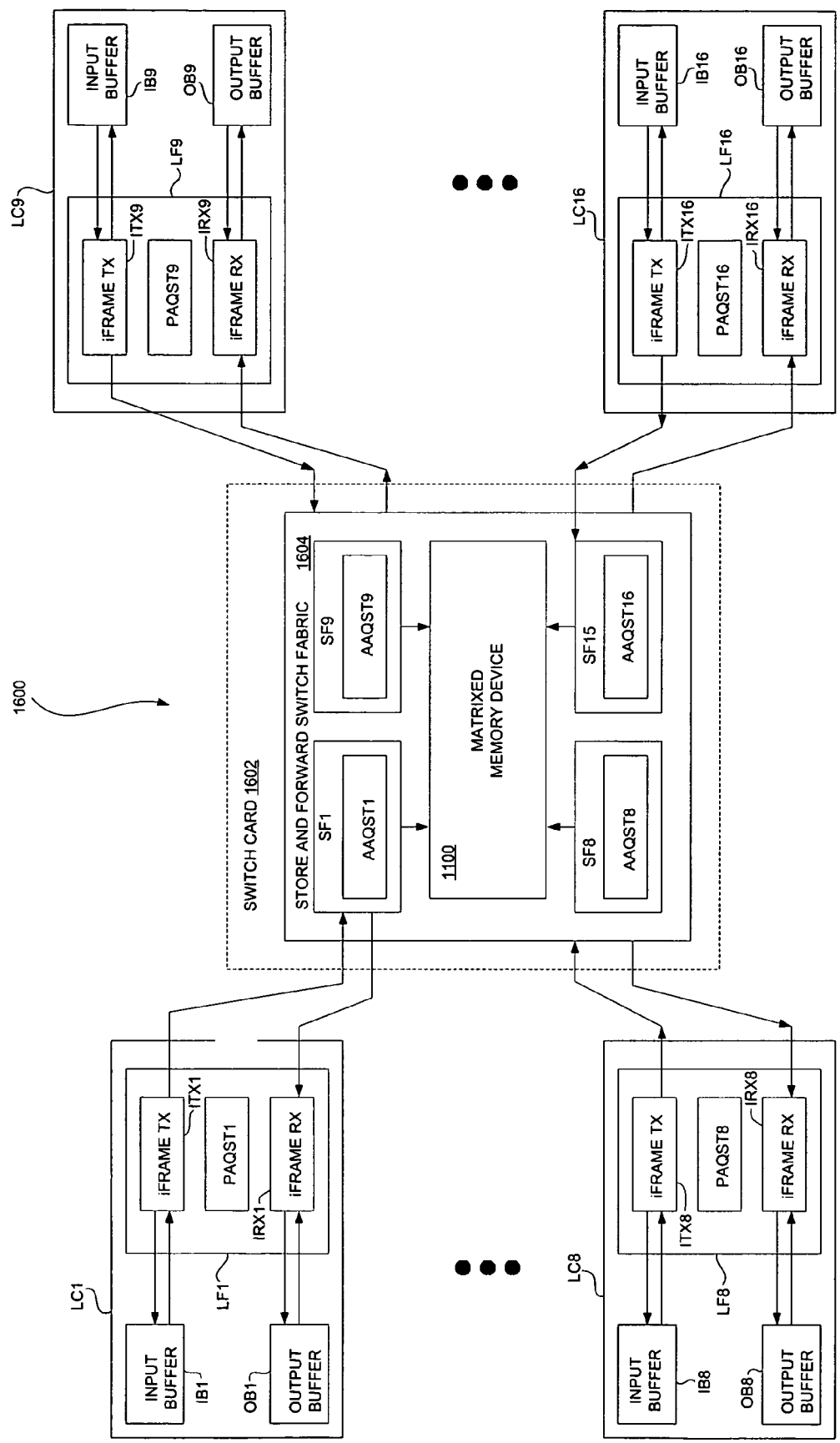
FIG. 16 illustrates the block diagram of a Switch Queue Predictive Protocol architecture (SQPP) in which a matrixed memory array device is used as a store and forward switch fabric in accordance to an embodiment of the present invention.

FIG. 16 is a block diagram illustrating a Switch Queue Predictive Protocol (SQPP) architecture 1600 in accordance with one embodiment of the present invention. SQPP architecture 1600 includes a switch card 1602 having a store-and-forward switch fabric 1604, and a plurality of line cards $LC_1$-$LC_{16}$. Line cards $LC_2$-$LC_7$ and $LC_{10}$-$LC_{15}$ are not illustrated for purposes of clarity. However, these line cards are connected in the same manner as illustrated line cards $LC_1$, $LC_8$, $LC_9$ and $LC_{16}$. Although sixteen line cards are described in the present embodiment, it is understood that other numbers of line cards can be used in other embodiments. Each line card $LC_N$ includes an input buffer $IB_N$, an output buffer $OB_N$, and a line card function block $LF_N$, where N includes the integers between 1 and 16, inclusive. Thus, line card $LC_1$ includes input buffer $IB_1$, output buffer $OB_1$ and line card function block $LF_1$. Each line card function $LF_N$ includes an internal frame transmitter $ITX_N$, an internal frame receiver $IRX_N$ and a Predicted Available Queue Space Table $PAQST_N$. Store-and-forward cross-point switch fabric 1604 includes matrixed memory array device 1100 and a plurality of switching function blocks $SF_1$-$SF_{16}$. Each switching function block $SF_N$ includes a corresponding Actual Available Queue Space Table $AAQST_N$. Each of the switching function blocks $SF_1$-$SF_{16}$ is coupled to a corresponding one of line card function blocks $LF_1$-$LF_{16}$. As described in more detail below, matrixed memory array device 1100 and input buffers $IB_1$-$IB_{16}$ are enhanced by the line card function blocks $LF_1$-$LF_{16}$ and the switching function blocks $SF_1$-$SF_{16}$, thereby enabling matrixed memory array device 1100 and input buffers $IB_1$-$IB_{16}$ to communicate with each other. As a result, the input buffers $IB_1$-$IB_{16}$ are enabled to automatically regulate the amount of traffic that is sent to matrixed memory array device 1100. In other words, the SQPP arbitration is performed in a distributed manner, so that multiple (distributed) less complex arbiters can be used. These distributed arbiters enable scaling to higher bandwidths.

Continuing with FIG. 16, there are two iFrame formats that are used in SQPP architecture 1600, namely, the User iFrame and the Control iFrame. The User iFrame is used to carry user data and generalized SQPP control information. The Control iFrame is used to carry specialized SQPP control. A User iFrame is composed of a User Switching Tag and user payload data. When SQPP architecture 1600 is initialized (i.e., before any iFrames are transmitted), each $PQS_{jkq}$ entry in the PAQST is set with a starting queue size that indicates how many iFrames the switch fabric cross-point queues can hold. At this time, the cross-point queues in switch fabric 1604 are all empty (cleared), such that all entries in the cross-point fabric are available. Similarly, each $AQS_{jkq}$ entry in the AAQST is set a starting queue size representative of the capacity of each cross-point queue.

Line card $LC_j$ is allowed to send user data to input ports 1102 if and only if the predicted available queue space $PQS_{jkq}$ is not zero. When line card $LC_j$ sends an iFrame to input ports 1102 of switch fabric 1604, the line card $LC_j$ decrements the corresponding $PQS_{jkq}$ value by one. When switch fabric 1604 receives the iFrame, this switch fabric 1604 decrements the corresponding $AQS_{jkq}$ value by 1. When the switch fabric 1604 forwards/transmits the iFrame to output ports 1114, the $AQS_{jkq}$ value is incremented by 1 and switch fabric 1604 sends a PQS Update message to the originating line card $LC_j$ to indicate that the iFrame has been forwarded. When the line card $LC_j$ receives the PQS Update, the line card $LC_j$ increments the $PQS_{jkq}$ value by 1.

The goal of the SQPP 1600 is to keep $PQS_{jkq}=AQS_{jkq}$ all the time. However, for various reasons such as iFrames being lost or corrupted and because of timing delays between switch fabric 1604 and line cards $LC_1$-$LC_{16}$, each $AQS_{jkq}$ and $PQS_{jkq}$ value can become different. Therefore specialized SQPP procedures of the control iFrame are needed to periodically re-synchronize them.

Thus, SQPP architecture 1600 is designed to enable each of line cards $LC_1$-$LC_{16}$ to predict whether there is available space in the cross-point queues of switch fabric 1604. An iFrame can be transmitted from line cards $LC_1$-$LC_6$ to switch fabric 1604 only if available cross-point queue space is predicted within switch fabric 1604. The accuracy of the prediction depends on the ability of switch fabric 1604 to find sufficient transmission time to update line cards $LC_1$-$LC_{16}$ with the latest queue space information. The queue space information stored by line cards $LC_1$-$LC_{16}$ is commonly out of synchronization with the queue space information stored by switch fabric 1604, due to the time delay for formulating, transmitting and interpreting the SQPP messages.

In contrast to cross-point buffers 103 used in switch fabric 102 shown in FIG. 3, SQPP architecture 1600 uses matrixed memory array device 1100. The use of matrixed memory array device 1100 reduces the internal clock rate and more efficiently stores and forwards large data packets. Asynchronous operation using matrixed memory array device 1100 makes it easier to switch variable length packets in comparison to cross-point buffers 103 because data packets can be stored, read, written in memory bricks 1112 randomly. Moreover, SQPP 1600 allows total variable length packet switching, significantly reducing the switch port transmission rate. In some instances, matrixed memory array device 1112 can reduce the switch port transmission rate to a factor of 4 as compared to the use of cross-point buffers 103. As the required speed of the switch fabric is decreased, power dissipation is decreased.

Figure 17:
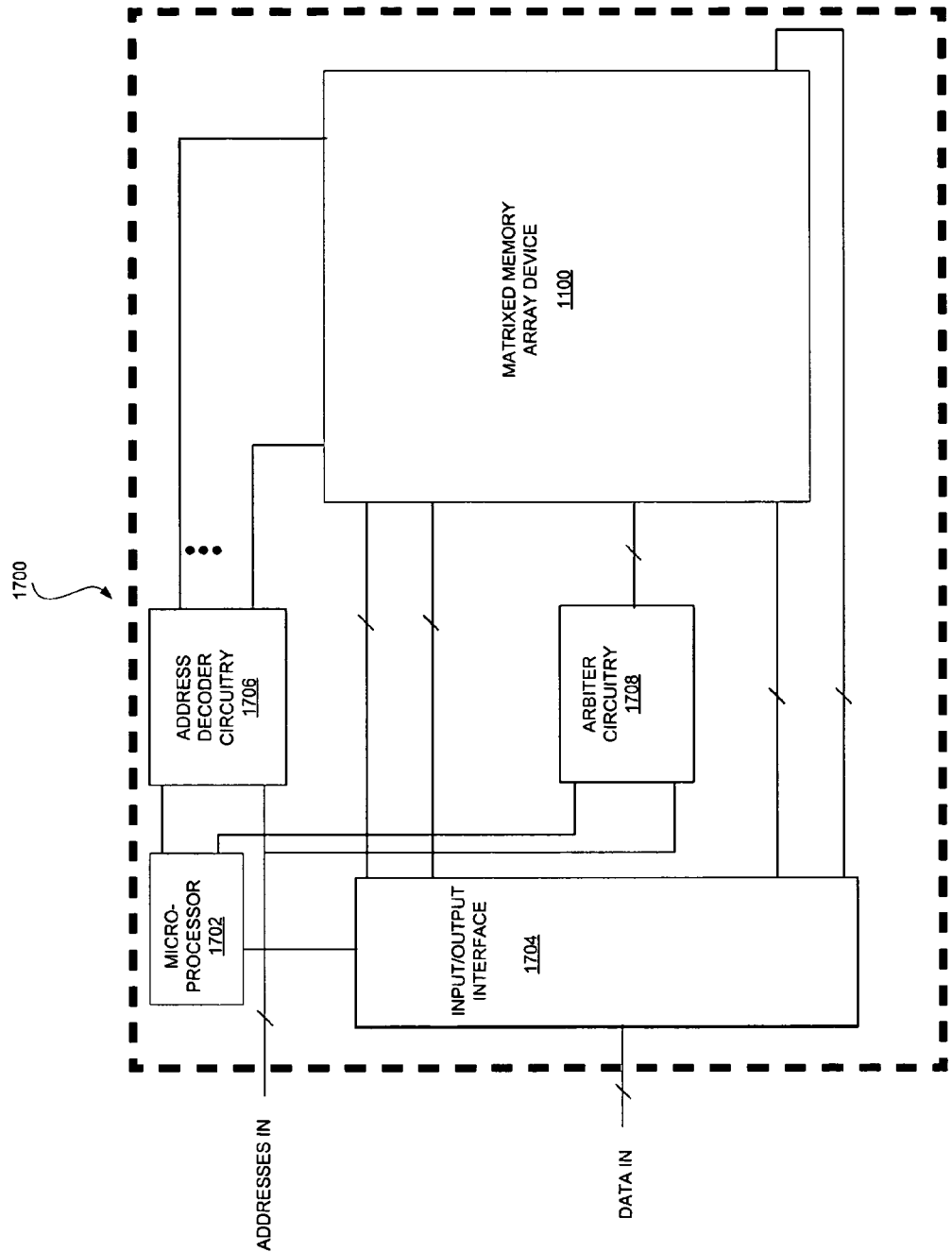
FIG. 17 shows a block diagram of a computer system that includes the matrixed memory array device in accordance with an embodiment of the present invention.

FIG. 17 is a block diagram of a computer system 1700 that uses matrixed memory array device 1100 as data storage. Computer system 1700 includes a microprocessor 1702, an input-output (I/O) interface 1704, address decoder circuitry 1706, a matrixed memory array device 1100, and arbiter circuitry 1708. When data packets are received at computer system 1700, microprocessor 1702 receives the instruction and instructs arbiter circuitry 1708 regarding the priorities of the data packet. Addresses of the data packet are fed to address decoder circuitry 1706 to determine which memory bricks 1112 are to be used to perform the instruction. After arbiter circuitry 1708 has assigned priorities to data packet, and address decoder circuitry 1706 has decoded the addresses of memory bricks 1112, data are coupled to memory bricks 1112 via input/output interface 1704. Stored data in matrixed memory array device 1100 can also be retrieved and transmitted to end-users via input/output interface 1704. Other functions relating to the data packet such as error correction (ECC), priorities re-assignment, etc. can be performed by microprocessor 1702 and/or arbiter circuitry 1708.

In one embodiment of the present invention shown in FIG. 17, the architecture of matrixed memory array device 1100 can be similar to those memory architectures used in Dual Port memory devices but only uses one input port 1102 and a separate output port 1114. Each memory brick 1100 is interconnected with a unique combination of one input port 1102 and a separate output port 1114. By using matrixed memory array device 1100 the internal clock can be reduced to 125 MHz to support 40-octet packets. Thus, matrixed memory array device 1100 can be used as storage in any communication system to improve storage capacity, internal clock rate, and data throughput.

Continuing with FIG. 17, input terminals 1238 and complement input terminals 1240 of 8-T memory cells 1200 are bus inter-connected together such that the same bit position (e.g. bit 1) of each word 1502 within input data block 1504 are bus interconnected together and ultimately connected to drive amplifier 1402. The same interconnection method is used for input terminals 1238 and complement input terminals 1240 of all bit positions in all data words 1502 in input data block 1504. In one embodiment, the collection of drive amplifiers 1402 associated with input data block 1504 are organized together to form input port 1102. The same interconnection is provided on the remaining input data blocks 1504 to form M input data blocks 1504 and M input ports 1102.

Each input data block 1504 is then divided into N memory bricks 1112. Output terminals 1234 and complement output terminals 1248 of 8-T memory cells 1200 within memory brick 1112 are also bus interconnected such that the same bit position (e.g. Bit 1) of each data word 1502 within that memory brick 1112 are bus interconnected together. Within output data block 1506, input data bus 1108 of memory brick 1112 is not interconnected. Instead memory bricks 1112 are interconnected together such that the same memory brick 1112 position (e.g. Brick #1) within each of input data block 1504 is interconnected together to form output data block 1506. For example, output terminal 1234 and complement output terminal 1248 of bit 1 of memory brick 1 of input data block 1 is interconnected with bit 1 of memory brick 1 of input data block 2 and so on to Bit 1 of memory Brick 1 of input data block M. This string of connections is then interconnected to drive sense amplifier 1404. The same interconnection method is used for all of the bit positions in all of data words 1502 within the same memory brick 1112 within output data blocks 1506 to form N output ports 1114. In one embodiment, the collection of drive amps (e.g. 64) are then used to form input ports 1102 for that input data block 1504 (e.g. Input Port 1). The same procedure is used to form N Input Blocks with N Input Ports. The result is an M×N matrixed memory array device 1100.

Still referring to FIG. 17, prioritized access could be implemented in many different forms that use different address assignment rules. Furthermore, the interconnections between each 8-T memory cell 1200 and its associated output terminal 1234 and complement output terminal 1248 can be implemented using a "wired logic" technique which is commonly implemented using an open drain transistor. The interconnection between each 8-T memory cell 1200 and its associated input data bus 1108 can be implemented using a broadcast bus as shown in FIG. 14 (one drive amplifier 1402 driving many 8-T memory cells 1200).

Data Packet Transfer Method

Figure 18:
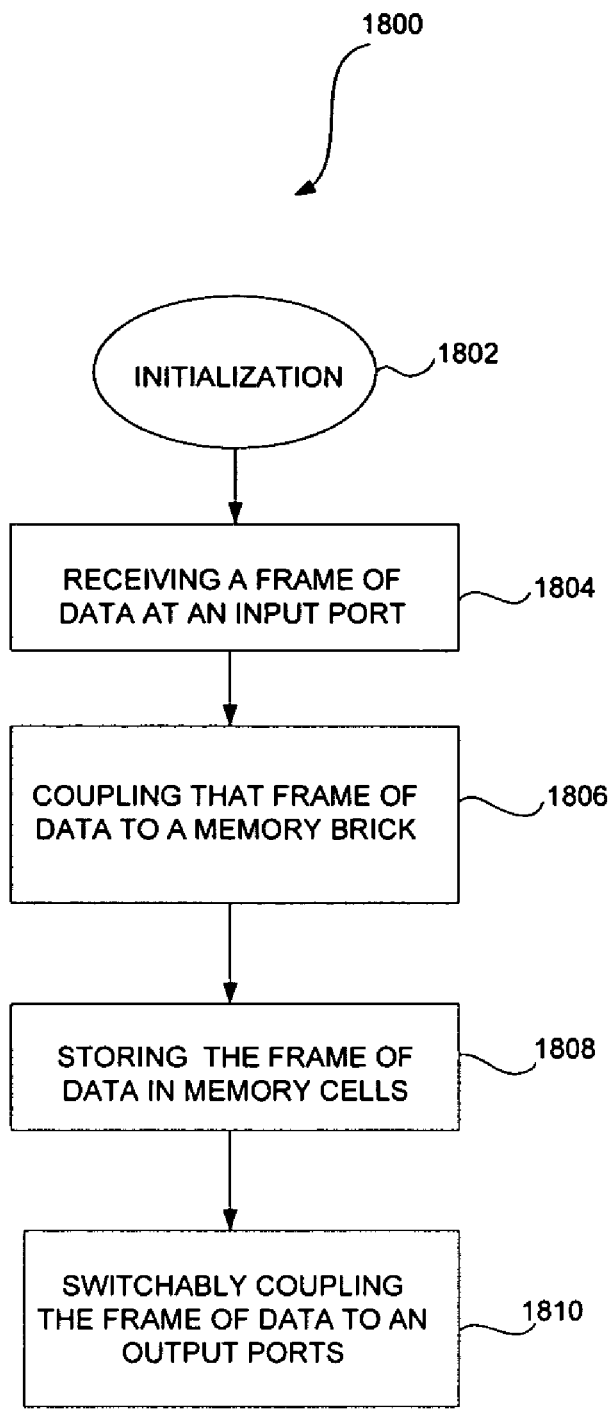
FIG. 18 shows a flow chart that illustrates a method for transferring data packets in accordance with an embodiment of the present invention.

FIG. 18 is a flow chart 1800 illustrating a method of transferring data packets. Process 1800 includes steps of receiving a frame of data, coupling the received frame of data to a memory brick, storing the received frames of data into the memory brick, and switchably coupling the frames of data to an output port.

The process 1800 begins as shown by step 1802 with an initialization process. In the present embodiment, the initialization of step 1802 begins by acquiring operational parameters of matrixed memory array device 1100 such as addresses of memory bricks 1112, data words 1502, 8-T memory cells 1200, and other parameters. In addition, the initialization of step 1802 also clearing out the contents of 8-T memory cells 1200 so that all entries to memory bricks 1112 are available. As discussed in FIG. 13, 8-T memory cells 1200 can be cleared out of unwanted residual data by driving input terminals 1238 to logic LOW and complement input terminals 1240 to logic HIGH. In one embodiment as shown in FIG. 16, the initialization process of step 1802 can include switch card 1602 preparing a datagrams for frames of data to be stored in memory bricks 1112. Each $AQS_{jkq}$ entry in the AAQST is set a starting queue size representative of the capacity of each memory brick 1112. During the initialization step 1802, the AAQST table is filled up. Line cards also prepare whether data will be sent in unicast (M=0) or in multicast (M=1). Also during initialization step 1802, user data are divided into User iFrame and the Control iFrame, each having different formats. The User iFrame is used to carry user data and generalized SQPP control information. The Control iFrame is used to carry specialized SQPP control. A User iFrame is composed of a User Switching Tag and user payload data.

Continuing with step 1802, in the described embodiment shown in FIG. 17, microprocessor 1702 or arbiter circuitry 1708 sends signals to matrixed memory array device 1100 to clear out the contents of 8-T memory cells 1200. In addition, microprocessor 1702 prepares for prioritized access to matrixed memory array device 1100 and loads priority instructions to arbiter circuitry 1708. Microprocessor 1702 also organizes instructions and sends addresses to address decoder circuitry 1706.

Referring to step 1804, frames of data are received at selected input ports 1102. In the embodiments shown in FIGS. 11-16, input ports 1102 can be either buffers or drive amplifiers 1402. In one embodiment as shown in FIG. 16, user data that is received at a line card is translated into datagrams which are then transmitted to input port 1102 of matrixed memory array device 1100. When memory bricks 1112 receive frames of data or iFrames, these memory bricks 1112 decrement the corresponding $AQS_{jkq}$ value by 1. In the described embodiment shown in FIG. 17, frames of data can be temporarily stored or amplified when received at input ports 1102.

Referring to step 1806, after frames of data are received (step 1804), they are coupled to a memory brick 1112. In the embodiments shown in FIGS. 11-16, the frames of data are coupled to memory bricks 1112 via input data buses 1108. As described above in FIG. 15, when frames of data are coupled to memory bricks 1112, input enable terminals 1242 of selected 8-T memory cells 1200 are turned on. More particularly, 8-T memory cells 1200 are selected by enabling input ports 1102 to select the columns (or input data blocks 1504) and by enabling input enable terminals 1242.

Continuing with step 1806, in the present embodiment addresses data in the frame of data is used to route the frame of data to particular memory brick 1112 that is located at the cross-point between input port 1102 that receives the frame of data (step 1804) and the output port 1114 that is indicated by the address data. In one embodiment, the frames of data are Frames formatted using the SQPP Protocol shown in FIG. 2-6B. Alternatively, other protocols and formats could be used to format and transmit the frames of data.

Referring to step 1808, frames of data are stored in selected 8-T memory cells 1200. More particularly, as each frame of data is received at particular memory brick 1112, that frame of data is stored in that memory brick 1112. As each frame of data is routed to a memory brick 1112 that is located at the cross-point between the input port 1102 that receives the frame of data and the output port 1114 that is indicated by the address data, the frame of data is stored in the memory brick 1112 that couples to the output data bus 1110 indicated by the address data. More particularly, the frame of data is stored in 8-T memory cells 1200 having output terminals 1234 and complement output terminals 1248 that are coupled to the output data bus 1110 that couples to output port 1114 indicated by the address data.

In the embodiments as shown in FIGS. 11-16, a frame of data is stored in an 8-T memory cell 1200 as follows. A logic 1 or HIGH is stored in 8-T memory cell 1200 by providing logic 1 signal to input terminals 1238 and its complement input terminals 1240 and turning on input enable terminals 1242 of the selected 8-T memory cells 1200. Alternatively, logic 0 or LOW is stored in 8-T memory cell 1200 by providing logic 0 signal to input terminals 1238 and its complement input terminals 1240 and turning on input enable terminals 1242. During this time, stored frames of data can be re-assigned to either a lower or higher priority. Thus, a First In First Out (FIFO) order of data retrieval in matrixed memory array device 1100 can be changed to First In Last Out (FILO). In other words, data packets in matrixed memory array device 1100 can be accessed randomly or inconsequentially. Priority of a frame of data can be changed by changing the contents of the priority bits contained therein. More particularly, the content of priority bits are changed by changing the input logic signals of input terminals 1238 and complement input terminals 1240 of 8-T memory cells 1200 that are reserved for priority bits. In the described embodiment of FIG. 16, the specialized SQPP procedure is performed during this time to re-synchronize $AQS_{jkq}$ and $PQS_{jkq}$ in case iFrames are lost or corrupted. Frames of data are purged by carrying out the purge instructions after data packets have been stored in memory bricks 1112.

Referring now to step 1810, the frame of data stored in step 1808 are switchably coupled to an output port 1114. In the embodiments shown in FIGS. 11-16, memory brick 1112 functions as a switch that, when instructed, transmits the stored frame of data to an output port 1114. More particularly, output enable terminals 1244 of selected 8-T cells within selected memory bricks 1112 are turned on, thus coupling frames of data to output data buses 1110. Output data buses 1110 include a plurality of output terminals 1234 and complement output terminals 1248. The frames of data are coupled from 8-T memory cells 1200 to output data buses 1110 to second data buses 1106 and then to output ports 1114. In one embodiment, output ports 1114 can be sense amplifiers 1404. In another embodiment, output ports 1114 can be buffers. Thus, when frames of data are coupled to output ports 1114, they are sensed and amplified to restore their signal strength before being coupled to external circuitry such as line cards ($LF_j$).

In one embodiment, the SQPP architecture of FIGS. 2-10 is used for performing method 1800. More particularly, user data that is received at a line card ($LC_{1-N}$) is translated to datagrams (iFrames) which are transmitted to an input port 1102 of matrixed memory array device 1100. When an iFrame is received at an input port (step 1804), it is routed to the memory brick 1112 that corresponds to the address indicated in the user switching tag (step 1806) where it is stored (step 1808). In the present embodiment, stored iFrames are coupled to their respective output ports 1114 based on their QoS priority. At any time after an iFrame is stored, it can be erased or changed (e.g. the QoS priority can be changed). Changes can be made using control iFrames that indicate the desired change. The control iFrame with specialized SQPP error correction code can also be performed.

Process 1800 allows for the support of both unicast (M=0) and multicast traffic (M=1). The storage of frames of data at cross-points of the switching fabric until they are to be coupled to an output port allows for individual frames of data to be changed or erased, providing a method for transferring data packets that is more flexible and efficient than prior art systems and methods. Moreover, process 1800 reduces the internal clock rate and more efficiently stores and forwards large data packets. Asynchronous operation using process 1800 makes it easier to switch variable length packets because data packets can be stored, read, written into memory bricks 1112 randomly. Moreover, process 1800 allows total variable length packet switching, significantly reducing the switch port transmission rate. In some instances, matrixed memory array device 1112 can reduce the switch port transmission rate to a factor of 4 as compared to the use of cross-point buffers 103. As the required speed of the switch fabric is decreased, power dissipation is decreased.

Finally, in the embodiment shown in FIG. 17, by receiving a frame of data, coupling that frame of data to memory brick 1112, storing those frames of data into memory bricks 1112, and switchably coupling those frames of data to selected output ports 1114, process 1800 provides complete flexibility and significantly improved efficiency in asynchronous communications of data packets. More particularly, because process 1800 stores frames of data into memory bricks 1112 (steps 1806-1808) that are independent storage units, the present system is more flexible and easier to manage.

Although the invention has been described in connection with several embodiments, it is understood that this invention is not limited to the embodiments disclosed, but is capable of various modifications, which would be apparent to a person skilled in the art. Thus, the invention is limited only by the following claims.

What is claimed is:

1. A matrixed memory array device, comprising:
   a plurality of first data buses and a plurality of second data buses, the plurality of first data buses being different and separate from the plurality of second data buses;
   a plurality of input ports for receiving a plurality of frames of data and for coupling the frames of data onto one of the plurality of first data buses, each of the plurality of first data buses coupled to and dedicated to one of each of the plurality of input ports;
   a plurality of output ports coupled to the plurality of second data buses for transmitting the plurality of frames of data to external circuitry, each of the plurality of second data buses coupled to and dedicated to one of each of the plurality of output ports; and
   a plurality of memory bricks, each memory brick further comprising a plurality of eight-transistor (8-T) memory cells, each of the plurality of memory bricks coupled to one of the plurality of first data buses and one of the plurality of second data buses to form a matrix of said memory bricks wherein each memory brick is dedicated to only one of the plurality of input ports and only one of the plurality of output ports and wherein each memory brick is operable to switchably couple the plurality of frames of data from the input port to the corresponding output port, each of the 8-T memory cells having an input terminal separate from an output terminal and operable to store a data bit of the plurality of frames of data and read a data bit of the plurality of frames of data, each of the 8-T memory cells further comprising:
   a first Field Effect Transistor (FET) inverter coupled to a second FET inverter, each FET inverter comprising a pull-up transistor coupled in series to a pull-down transistor, the gate of the pull-up transistor of the first FET inverter electrically coupled to the gate of the pull-down transistor of the first FET inverter to form an input of the first FET inverter, the drain of the pull-up transistor of the first FET inverter coupled to the source of the pull-down transistor of the first FET inverter to form an output of the first FET inverter, the source of the pull-up transistor of the first FET inverter electrically coupled the source of the pull-up transistor of the second FET inverter and to a supply voltage, the drain of the pull-down transistor of the first FET inverter electrically coupled the drain of the pull-down transistor of the second FET inverter and to an electrical ground, the gate of the pull-up transistor of the second FET inverter electrically coupled to the gate of the pull-down transistor of the second FET inverter to form an input of the second FET inverter, the source of the pull-up transistor of the second FET inverter coupled to the drain of the pull-down transistor of the second FET inverter to form an output of the second FET inverter;

a first input enable FET switch, the source of the first input enable FET switch coupled to the output of the first FET inverter and to the input of the second FET inverter, the drain of the first input enable FET switch forming the input terminal and coupled to one of the first data buses;

second input enable FET switch, the drain of the second input enable FET switch coupled to the output of the second FET inverter and to the input of the first FET inverter, the source of the second input enable FET switch forming input terminal and coupled to a complement first data bus, the gate of the first input enable FET switch coupled to the gate of the second input enable FET switch to form an input enable terminal;

a first output enable FET switch, the source of the first output enable FET switch coupled to the output of the first FET inverter, the drain of the first output enable FET switch forming the output terminal and coupled to one of the second data buses; and a second output enable FET switch, the drain of the second output enable FET switch coupled to the output of the second FET inverter, the source of the second output enable FET switch forming an output terminal and coupled to a complement second data bus, the gate of the second output enable FET switch coupled to the gate of the first output enable FET switch to form an output enable terminal.

2. The matrixed memory array device of claim 1 wherein the data bit of the plurality of frames of data can be read from, written to and erased from the 8-T memory cells, the matrixed memory array device further comprising an external arbiter circuitry coupled to each of the 8-T memory cells for instructing each of the 8-T memory cells to transmit stored data over the second data buses dedicated to each of the 8-T memory cells.

3. The matrixed memory array device of claim 1 wherein each memory brick further comprises an array of sense amplifiers coupled to the output terminals of the 8-T memory cells for sensing and amplifying said data bits of the plurality of frames of data prior to transmitting the plurality of frames of data to the external circuitry.

4. The matrixed memory array device of claim 1 wherein each of the plurality of memory bricks further comprises an array of drive amplifiers coupled to the input terminals of each of the 8-T memory cells for amplifying the data bits of the plurality of frames of data before the plurality of frames of data are stored to each of the plurality of memory bricks.

5. The maxtrixed memory array device of claim 1 wherein each of the plurality of memory bricks further comprises a plurality of input data buses for coupling each of the plurality of first data buses into each of the plurality of memory bricks and a plurality of output data buses for coupling each of the plurality of memory bricks into each of the plurality of second data buses, the plurality of input terminals of the 8-T memory cells within the plurality of memory bricks forming the plurality of input data buses, the plurality of output terminals of the 8-T memory cells within the plurality of memory bricks forming the plurality of output data buses.

6. The matrixed memory array device of claim 5 wherein the plurality of memory bricks positioned in a row of the matrixed memory array device form an output data block and the plurality of memory bricks positioned in a column of the matrixed memory array device form an input data block, the plurality of input data buses within the input data block being coupled together and to one of the plurality of first data buses, the plurality of output data buses of within the output data block being coupled together and to one of the plurality of second data buses.

7. The matrixed memory array device of claim 1 further comprising a plurality of input buffers coupled to transmit the data bits of the plurality of frames of data to each of the plurality of input ports and a plurality of output buffers coupled to receive the data bits of the plurality of frames of data from each of the plurality of output ports.

8. The matrixed memory array device of claim 1 further comprising:
   a plurality of drive amplifiers electrically coupled to each of the plurality of input ports for receiving and amplifying the data bits of the plurality of frames of data;
   a plurality of sense amplifiers electrically coupled to each of the plurality of output ports, for detecting and amplifying said data bits of the plurality of frames of data before transmitting the plurality of frames of data to the external circuitry; and
   external data bus interface circuitry coupled to the plurality of input ports and the plurality of output ports for coupling the data bits of the plurality of frames of data into the plurality of input ports and transmitting the data bits of the plurality of frames of data stored in the plurality of memory bricks into the external circuitry.

9. The matrixed memory array device of claim 1 wherein each of the plurality of memory bricks stores the plurality of frames of data including a predetermined priority, the matrixed memory array further comprising a priority circuitry coupled to the plurality of memory bricks for assigning the predetermined priority.

10. The matrixed memory array device of claim 1 further comprising a plurality of brick address decode circuitry, each brick address decode circuitry coupled to one of the plurality of memory bricks for decoding an address of the memory brick.

11. The matrixed memory array device of claim 1 wherein the plurality of memory bricks are grouped to form data words and the data bit of the same position within the data words in the memory brick are electrically coupled together.

12. A computer system comprising:
   a microprocessor unit;
   an input/output (I/O) unit coupled to the microprocessor for providing and retrieving a packet of data; and
   a matrixed memory array device, coupled to the microprocessor unit and the I/O unit, for storing a plurality of frames of data which are a portion of the packet of data, the matrixed memory array device further comprising:

a plurality of first data buses and a plurality of second data buses, the plurality of first data buses being different and separate from the plurality of second data buses;

a plurality of input ports for receiving the plurality of frames of data and for coupling the plurality of frames of data onto one of the plurality of first data buses, each of the plurality of first data buses coupled to and dedicated to one of each of the plurality of input ports;

a plurality of output ports coupled to the plurality of second data buses for transmitting the plurality of frames of data to external circuitry, each of the plurality of second data buses coupled to and dedicated to one of each of the plurality of output ports; and a plurality of memory bricks, each memory brick further comprising a plurality of eight-transistor (8-T) memory cells, each of the plurality of memory bricks coupled to one of the plurality of first data buses and one of the plurality of second data buses to form a matrix of said memory bricks wherein each memory brick is dedicated to only one of the plurality of input ports and only one of the plurality of output ports and wherein each memory brick is operable to switchably couple the plurality of frames of data from the input port to the corresponding output port, each of the 8-T memory cells having an input terminal separate from an output terminal and operable to store a data bit of the plurality of frames of data and read a data bit of the plurality of frames of data, each of the 8-T memory cells further comprising;

a first Field Effect Transistor (FET) inverter coupled to a second FET inverter, each FET inverter comprising a pull-up transistor coupled in series to a pull-down transistor, the gate of the pull-up transistor of the first FET inverter electrically coupled to the gate of the pull-down transistor of the first FET inverter to form an input of the first FET inverter, the drain of the pull-up transistor of the first FET inverter coupled to the source of the pull-down transistor of the first FET inverter to form an output of the first FET inverter, the source of the pull-up transistor of the first FET inverter electrically coupled the source of the pull-up transistor of the second FET inverter and to a supply voltage, the drain of the pull-down transistor of the first FET inverter electrically coupled the drain of the pull-down transistor of the second FET inverter and to an electrical ground, the gate of the pull-up transistor of the second FET inverter electrically coupled to the gate of the pull-down transistor of the second FET inverter to form an input of the second FET inverter, the source of the pull-up transistor of the second FET inverter coupled to the drain of the pull-down transistor of the second FET inverter to form an output of the second FET inverter;

a first input enable FET switch, the source of the first input enable FET switch coupled to the output of the first FET inverter and to the input of the second FET inverter, the drain of the first input enable FET switch forming the input terminal and coupled to one of the first data buses;

second input enable FET switch, the drain of the second input enable FET switch coupled to the output of the second FET inverter and to the input of the first FET inverter, the source of the second input enable FET switch forming input terminal and coupled to a complement first data bus, the gate of the first input enable FET switch coupled to the gate of the second input enable FET switch to form an input enable terminal;

a first output enable FET switch, the source of the first output enable FET switch coupled to the output of the first FET inverter, the drain of the first output enable FET switch forming the output terminal and coupled to one of the second data buses; and a second output enable FET switch, the drain of the second output enable FET switch coupled to the output of the second FET inverter, the source of the second output enable FET switch forming an output terminal and coupled to a complement second data bus, the gate of the second output enable FET switch coupled to the gate of the first output enable FET switch to form an output enable terminal.

13. The computer system of claim 12 wherein the data bit of the plurality of frames of data can be read from, written to and erased from the 8-T memory cells, the computer system further comprising an arbiter circuitry coupled to an address decoder circuitry for instructing each of the 8-T memory cells to transmit stored data over one of the plurality of second data buses.

14. The computer system of claim 12 wherein the plurality of memory bricks positioned in a row of the matrixed memory array device forms an output data block and the plurality of memory bricks positioned in a column of the matrixed memory array device form an input data block, the plurality of input data buses within the input data block being coupled together and to one of the plurality of first data buses, the plurality of output data buses within the output data block being coupled together and to one of the plurality of second data buses.

15. The computer system of claim 12 wherein the array of memory cells in the memory brick is arranged into a plurality of data words, each data word further comprising a plurality of data bits.

16. A packet switching system comprising:
a switch fabric having a cross-point switch, a plurality of memory bricks, wherein each of the plurality of memory bricks are located at one of each cross-point of the cross-point switch and a plurality of Actual Available Queue Space Tables (AAQSTs), each identifying the actual queue space available in each of the plurality of memory bricks; and
a plurality of line cards, each coupled to the switch fabric, and each having an input buffer, an output buffer, and a predicted available queue space table (PAQST) identifying predicted queue space available in the plurality of memory bricks.

17. The packet switching system of claim 16 wherein each line card further comprises a line card function (LF) for converting an input data packet having a first format into one or more frames of data having a second format.

18. The packet switching system of claim 17 wherein the second format further comprises a user switching tag and a data payload.

19. A method of transferring data packets comprising:
receiving a packet with a source line card;
transforming the packet into one or more frames in the source line card;
transmitting the one or more frames from the source line card to a switch fabric having a cross-point switch, wherein the cross-point switch comprises a cross-point buffer having a plurality of cross-point memory bricks;

storing the one or more frames in a cross-point memory brick in the cross-point switch;

forwarding the one or more frames from the cross-point memory brick to a destination line card;

maintaining a plurality of actual available queue space tables (AAQSTs) in the switch fabric, wherein each of the AAQSTs identifies actual available queue space in the plurality of memory bricks; and maintaining a predicted available queue space table (PAQST) in each of the line cards, each of the PAQSTs identifying predicted available queue space in the plurality of memory bricks, each of the PAQSTs corresponding with one of the AAQSTs.

20. The method of claim 19 further comprising:

subdividing the data packet into a plurality of frames of data;

assigning a priority to each of the plurality of frames of data; and transferring the plurality of frames of data from the the source line card to the destination line card according to the assigned priority wherein a higher priority frame of data is transferred before a lower priority frame of data.

21. The method of claim 20 further comprising the steps of changing the assigned priority of at least one of the plurality of frames of data.

22. The method of claim 19 further comprising:

subdividing the data packet into a plurality of frames of data; and recombining the plurality of frames of data at the destination line card into the data packet.

23. The method of claim 22 further comprising:

transmitting a purge instruction from a line card to the memory brick;

purging at least one of the plurality of frames of data stored in the memory brick in response to the purge instruction.

24. The method of claim 19 further comprising identifying whether the frame of data is to be stored in a single memory brick or multiple memory bricks using one or more data bits in the frame of data.

* * * * *